United States Patent
Hare et al.

(10) Patent No.: US 12,465,620 B2
(45) Date of Patent: Nov. 11, 2025

(54) METHOD OF TREATING AGING FRAILTY IN SUBJECTS WITH INFLAMMAGING USING HUMAN MESENCHYMAL STEM CELLS

(71) Applicant: Longeveron Inc., Miami, FL (US)

(72) Inventors: Joshua M. Hare, Miami, FL (US); Ana Marie Landin, Miami, FL (US)

(73) Assignee: Longeveron Inc., Miami, FL (US)

( * ) Notice: Subject to any disclaimer, the term of this patent is extended or adjusted under 35 U.S.C. 154(b) by 92 days.

(21) Appl. No.: 16/348,756

(22) PCT Filed: Nov. 10, 2017

(86) PCT No.: PCT/US2017/061031
§ 371 (c)(1),
(2) Date: May 9, 2019

(87) PCT Pub. No.: WO2018/089752
PCT Pub. Date: May 17, 2018

(65) Prior Publication Data
US 2019/0290698 A1    Sep. 26, 2019

Related U.S. Application Data

(60) Provisional application No. 62/421,048, filed on Nov. 11, 2016.

(51) Int. Cl.
*A61K 35/28* (2015.01)
*A61P 9/00* (2006.01)
*A61P 39/00* (2006.01)

(52) U.S. Cl.
CPC ............... *A61K 35/28* (2013.01); *A61P 9/00* (2018.01); *A61P 39/00* (2018.01); *G01N 2500/00* (2013.01)

(58) Field of Classification Search
None
See application file for complete search history.

(56) References Cited

U.S. PATENT DOCUMENTS

| | | |
|---|---|---|
| 2009/0110689 A1 | 4/2009 | Mourich et al. |
| 2011/0110900 A1 | 5/2011 | Stephens et al. |
| 2012/0269785 A1 | 10/2012 | Woods et al. |
| 2016/0067213 A1 | 3/2016 | Ichim et al. |
| 2016/0067285 A1 | 3/2016 | Tigenix |
| 2019/0290698 A1 | 9/2019 | Hare et al. |

FOREIGN PATENT DOCUMENTS

| | | |
|---|---|---|
| CN | 101690731 A | 4/2010 |
| CN | 103180435 A | 6/2013 |
| JP | 2011-523858 A | 8/2011 |
| JP | 7276664 B2 | 5/2023 |
| WO | 2014/203267 A2 | 12/2014 |
| WO | 2016/102597 A1 | 6/2016 |
| WO | 2017/123667 A2 | 7/2017 |

OTHER PUBLICATIONS

Clegg A, Young J, Iliffe S, Rikkert MO, Rockwood K. Frailty in elderly people. Lancet. Mar. 2, 2013;381(9868):752-62. Epub Feb. 8, 2013. (Year: 2013).*
Shen J, Tsai YT, Dimarco NM, Long MA, Sun X, Tang L. Transplantation of mesenchymal stem cells from young donors delays aging in mice. Sci Rep. 2011;1:67. (Year: 2011).*
Phetfong J, Sanvoranart T, Nartprayut K, et al. Osteoporosis: the current status of mesenchymal stem cell-based therapy. Cell Mol Biol Lett. 2016;21:12. Published Aug. 12, 2016. (Year: 2016).*
Pietschmann P, Mechtcheriakova D, Meshcheryakova A, Föger-Samwald U, Ellinger I. Immunology of Osteoporosis: A Mini-Review. Gerontology. 2016;62(2): 128-37. Epub Jun. 17, 2015. (Year: 2015).*
Uccelli A, Moretta L, Pistoia V. Mesenchymal stem cells in health and disease. Nat Rev Immunol. Sep. 2008;8(9):726-36. (Year: 2008).*
Miguel et al."Frailty syndrome in the community-dewelling elderly with osteoarthritis" (2012), Rev Bras Reumatol, vol. 52(3): 331-347. (Year: 2012).*
Hubbard, R.E. et al., Frailty, inflammation and the elderly, Biogerontology 11(5):635-641 (2010).
Frasca, D. et al., A Molecular Mechanism for TNF-alpha-Mediated Downregulation of B Cell Responses, Journal of Immunology 188(1):279-286 (2012).
Bernardo M.E. et al., Mesenchymal Stromal Cells: Sensors and Switchers of Inflammation, Cell Stem Cell 13(4):392-402 (2013).
Hoogduijn M.J. et al., The immunomodulatory properties of mesenchymal stem cells and their use for immunotherapy, International Immunopharmacology 10(12):1496-1500 (2010).
Ghannan S. et al., Immunosuppression by mesenchymal stem cells: mechanisms and clinical applications, Stem Cell Research & Therapy 1:2 (2010).
Huang, X.P. et al., Differentiation of Allogeneic Mesenchymal Stem Cells Induces Immunogenicity and Limits Their Long-Term Benefits for Myocardial Repair, Circulation 122:2419-29 (2010).
International Search Report and Written Opinion mailed Apr. 30, 2018 in International Application No. PCT/US2017/061031.
T. E. Ichim et al., Placental mesenchymal and cord blood stem cell therapy for dialed cardiomyopathy, Reproductive Biomedicine on, 16(6):898-905, XP009180675, Jun. 1, 2008.

(Continued)

*Primary Examiner* — Teresa E Knight
(74) *Attorney, Agent, or Firm* — BUCHANAN INGERSOLL & ROONEY PC

(57) ABSTRACT

The present invention provides a method of treating subjects with non-ischemic dilated cardiomyopathy by administering a therapeutically effective amount of an isolated population of allogeneic human mesenchymal stem cells. The present invention also provides a method of treating subjects with symptoms of aging frailty by administering a therapeutically effective amount of an isolated population of allogeneic human mesenchymal stem cells.

8 Claims, 24 Drawing Sheets

(56) References Cited

OTHER PUBLICATIONS

P. J. Psaltis et al., Reparative Effects of Allogeneic Mesenchymal Precursor Cells Delivered Transendocardially in Experimental Nonishemic Cardiomyopathy, JACC: Cardiovascular Interventions, Elsevier, Amsterdam, NL, 3(9):974-983, IP027290326, Sep. 1, 2010.

J. M. Hare et al., Comparison of Allogeneic vs Autologous Bone Marrow-Derived Mesenchymal Stem Cells Delivered by Transendocardial Injection in Patients with Ischemic Cardiomyopathy, JAMA the Journal of the American Medical Association, 308(22):2369, XP055254332, Dec. 12, 2012.

B. B. Blomberg et al, Age effects on mouse and human B cells, Immunologic Research, Humana Press, Inc., US, 57(1):354-360, XP035952301, Nov. 8, 2013.

Henning, "Stem Cells in Cardiac Repair," Future Cardiol., (Jan. 2011), vol. 7, No. 1, pp. 99-117.

Office Action (Communication pursuant to Article 94(3) EPC) issued Feb. 18, 2022, by the European Patent Office in corresponding European Patent Application No. 17 812 104.2-1112. (6 pages).

Office Action (Notification of Examination Opinions) issued Feb. 18, 2022, by the Taiwanese Patent Office in corresponding Taiwanese Patent Application No. 106138911 and an English Translation of the Office Action. (13 pages).

Written Opinion issued Apr. 1, 2022, by the Intellectual Property Office of Singapore in corresponding Singapore Patent Application No. 11201904257Q. (8 pages).

Perin et al., "A Phase II Dose-Escalation Study of Allogeneic Mesenchymal Precursor Cells in Patients With Ischemic or Nonischemic Heart Failure", Circulation Research, vol. 117, Aug. 28, 2015, pp. 576-584.

Notice of Reasons for Rejection, issued in corresponding Japanese Patent Application No. P2019-524319 on Oct. 12, 2021, and English Translation.

Notice of Reasons for Rejection, issued in corresponding Japanese Patent Application No. P2019-524319 on Aug. 30, 2022, and English Translation.

Samuel Golpanian et al.; Rationale and design of the allogeneic human mesenchymal stem cells (hMSC) in patients with aging frailty via intravenous delivery (CRATUS) study: A phase I/II, randomized, blinded and placebo controlled trial to evaluate the safety and potential efficacy of allogeneic human mesenchymal stem cell infusion in patients with aging frailty, Onotarget vol. 7, No. 11, pp. 11899-11912.

Decision of Refusal for Preliminary Examination Issued Jul. 21, 2022, by the Taiwanese Patent Office in corresponding Taiwanese Patent Office in corresponding Taiwanese Patent Application No. 106138911 and English translation (11 pages).

Chinese Office Action issued Nov. 24, 2022 in corresponding Chinese Patent Application No. 2017800806363, with English translation.

Gengsheng Yu, et al., "Effects of mesenchymal stem cell transplantation on cardiac function and structure and electrophysiology in rabbits with dialated cardiomyopathy" Journal of Clinical Rehabilitative Tissue Engineering Research, No. 34, pp. 6776-6780.

Official Notification, issued on Oct. 27, 2022 in corresponding Israeli Patent Application No. 266561.

Office Action (Notice of Reasons for Rejection) issued on Apr. 25, 2023, by the Japanese Patent Office in corresponding Japanese Patent Application No. 2022-065222, and an English Translation of the Office Action. (10 pages).

Martinez-Gamboa, L. et al.,"Role of the spleen in peripheral memory B-cell hemostasis in patients with autoimmune thrombocytopenia purpura" Clinical Immunology, Feb. 2009, vol. 130, No. 2, pp. 199-212.

Office Action (Notice of Reasons for Rejection) issued on Nov. 7, 2023, by the Japanese Patent Office in corresponding Japanese Patent Application No. 2022-065222, and an English Translation of the Office Action. (6 pages).

Francois, S. et al."Stro-1Positive and Stro-1 Negative Human Mesenchymal Stem Cells Express Different Levels of Immunosuppression" Blood, 2005, vol. 106, No. 11, 2 pages.

Mushtaq, M. et al., Rationale and Design of The Percutaneous Stem Cell Injection Delivery Effects On Neomyogenesis in Dilated Cardiomyopathy (The Poseidon—DCM Study), J. of Cardiovasc. Transl. Res., 2014, vol. 7, pp. 769-780.

Written Opinion (Invitation To Respond To Written Opinion) and Comments issued on Jul. 28, 2025 by the Singaporean patent Office in Singaporean Patent Application No. 11201904257Q, 8 pages.

\* cited by examiner

| Characteristic | Treatment Group | | | | |
|---|---|---|---|---|---|
| | Allo-100M n=10 | Allo-200M n=10 | Placebo n=10 | Total n=30 | |
| Sex | | | | | |
| Male | 6 (60%) | 6 (60%) | 6 (60%) | 18 (60%) | |
| Female | 4 (40%) | 4 (40%) | 4 (40%) | 12 (40%) | |
| Race | | | | | |
| American Indian/Alaskan Native | 0 (0.0%) | 1 (10.0%) | 0 (0.0%) | 1 (3.3%) | |
| Asian | 0 (0.0%) | 0 (0.0%) | 0 (0.0%) | 0 (0.0%) | |
| Hawaiian/Pacific Islander | 0 (0.0%) | 0 (0.0%) | 0 (0.0%) | 0 (0.0%) | |
| Black or African American | 0 (0.0%) | 0 (0.0%) | 0 (0.0%) | 0 (0.0%) | |
| White | 10 (100.0%) | 9 (90.0%) | 10 (100.0%) | 29 (96.7%) | |
| More than One Race | 0 (0.0%) | 0 (0.0%) | 0 (0.0%) | 0 (0.0%) | |
| Other, Specify | 0 (0.0%) | 0 (0.0%) | 0 (0.0%) | 0 (0.0%) | |
| Unknown | 0 (0.0%) | 0 (0.0%) | 0 (0.0%) | 0 (0.0%) | |
| Not Answered | 0 (0.0%) | 0 (0.0%) | 0 (0.0%) | 0 (0.0%) | |
| Age at infusion in years | | | | | |
| Mean | 75 ± 7.4 | 76.3 ± 8.4 | 75.3 ± 6.8 | 75.5 ± 7.3 | |
| Infusion Status | 10 (100.0%) | 10 (100.0%) | 10 (100.0%) | 30 (100.0%) | |
| Canadian Clinical Frailty Scale | | | | | |
| 4 | 5 (50.0%) | 7 (70.0%) | 5 (50.0%) | 17 (56.7%) | |
| 5 | 3 (30.0%) | 1 (10.0%) | 5 (50.0%) | 9 (30.0%) | |
| 6 | 2 (20.0%) | 2 (20.0%) | 0 (0.0%) | 4 (13.3%) | |
| 7 | 0 (0.0%) | 0 (0.0%) | 0 (0.0%) | 0 (0.0%) | |
| Mini Mental State Examination | | | | | |
| Mean | 29.3 ± 0.8 | 28.5 ± 1.1 | 29.5 ± 1.0 | 29.1 ± 1.0 | |
| Hemoglobin Level (g/dL) | | | | | |
| Mean | 14.1 ± 1.2 | 13.5 ± 1.3 | 14.3 ± 1.2 | 14.0 ± 1.3 | |
| White Blood Cell Count (cells/mm³) | | | | | |
| Mean | 7160.0 ± 2437.8 | 6600.0 ± 1303.8 | 7070.0 ± 2214.6 | 6943.3 ± 1989.1 | |
| AST (U/L) | | | | | |
| Mean | 24.5 ± 7.6 | 20.7 ± 3.6 | 29.3 ± 11.1 | 24.8 ± 8.5 | |
| Six Minute Walk Test Distance (meters) | | | | | |
| Mean | 345.9 ± 103.4 | 390.6 ± 148.9 | 385.8 ± 83.1 | 374.1 ± 112.9 | |
| FEV1 (Liters) | | | | | |
| Mean | 2.5 ± 0.7 | 2.3 ± 0.9 | 2.3 ± 0.5 | 2.4 ± 0.7 | |

FIG. 2

††††  $p \leq 0.0001$ compared to young control;
‡‡‡  $p \leq 0.001$ compared to low TNF-α.

FIG. 12  † p≤0.05 compared to young control.

† p≤0.05 compared to young control.

METHOD OF TREATING AGING FRAILTY IN SUBJECTS WITH INFLAMMAGING USING HUMAN MESENCHYMAL STEM CELLS

FIELD OF THE INVENTION

The present invention relates to methods of administering therapeutically effective amounts of isolated populations of allogeneic mesenchymal stem cells to effect cellular and humoral immunity in subjects suffering from non-ischemic dilated cardiomyopathy. The present invention also relates to methods of administering therapeutically effective amounts of isolated populations of allogeneic mesenchymal stem cells to effect cellular and humoral immunity in subjects suffering from symptoms of aging frailty.

BACKGROUND OF THE INVENTION

Aging Frailty and Inflammaging

Aging frailty poses a very concerning problem for the overall health and well-being of individuals and is characterized as a syndrome of multisystem physiological dysregulation. Aging frailty is a geriatric syndrome characterized by weakness, low physical activity, slowed motor performance, exhaustion, and unintentional weight loss. See Yao, X. et al., Clinics in Geriatric Medicine 27(1): 79-87 (2011). Furthermore, there are many studies showing a direct correlation between aging frailty and inflammation. See Hubbard, R. E., et al., Biogerontology 11(5):635-641 (2010).

Immunosenescence is characterized by a low grade, chronic systemic inflammatory state known as inflammaging. See Franceshi, C. et al., Annals of the New York Academy of Sciences 908:244-254 (2000). This heightened inflammatory state or chronic inflammation found in aging and aging frailty leads to immune dysregulation and a complex remodeling of both innate and adaptive immunity. In immunosenescence, the T cell and B cell repertoire is skewed resulting in an increase in $CD8^+$ effector memory cells re-expressing CD45ra (TEMRA) and in the $CD19^+$ late/exhausted memory B cells, and a decrease in the $CD8^+$ Naïve T cells, and in the switched memory B cells ($CD27^+$). See Blomberg, B. B. et al., Immunologic Research 57(1-3): 354-360 (2013); Colonna-Romano, G. et al., Mechanisms of Ageing and Development 130(10):681-690 (2009); and Koch S. et al., Immunity & Ageing: 5:6 (2008). This shift in the T cell and B cell repertoire results in a refractory or less efficient immune status. It is well known that age-associated increase in systemic inflammation (TNF-α, IL-6, IL-8, TNFγ and CRP) induces impaired B cell function.

Inflammaging has received considerable attention because it proposes a link between immune changes and a number of diseases and conditions (such as aging frailty) common in old age. Circulating inflammatory mediators such as cytokines and acute phase proteins are markers of the low-grade inflammation observed to increase with aging. These pro-inflammatory cytokines (e.g., TNF-α, IL-6) impair the capacity of B cells to make protective antibodies to exogenous antigens and vaccines. This impaired B cell response is measured by reduced class switch recombination (CSR) which is the ability of immunoglobulins to switch isotype from IgM to a secondary isotype (IgG, IgA, or IgE). Immunoglobulin isotype switching is crucial for a proper immune response as the effector functions differ in each isotype. A key player in CSR and somatic hypermutation (SHM) is the enzyme, activation-induced cytidine deaminase (AID), encoded by the Aicda gene. AID's basic function in CSR and SHM is to initiate breaks in the DNA by converting cytosines to uracils in the switch and variable regions of immunoglobulins. E47, encoded by the Tcfe2a (E2A) gene, is a transcription factor belonging to the class I basic helix loop helix (bHLH) proteins, also known as E proteins. Without E47 expression, the B cell specific transcription factors EBF1 (early B cell factor) and Pax-5 (paired box protein) are not expressed. Both E47 and Pax-5 are key transcription factors in early development for the B cell lineage and mature B cell function. See Hagman J. et al., Immunity 27(1):8-10 (2007); Horcher M. et al., Immunity 14(6):779-790 (2001); Riley R. L. et al., Seminars in Immunology 17(5):330-336 (2005). The Pax-5 gene encodes the B cell lineage specific activator protein (BSAP) that is expressed at all stages of B cell differentiation, but not in terminally differentiated B cells. Pax-5 controls B cell commitment by repressing B lineage inappropriate genes and activating B cell specific genes making Pax-5 the B cell gatekeeper and is exclusively expressed in the B lymphoid lineage from the committed pro-B cell to the mature B cell stage. The B cell specific transcription factor, Pax-5, is not only highly important in early B cell development and B cell lineage commitment, it is also involved in CSR.

It has also been shown in humans that the amount of TNF-α made: (1) depends on the amount of system inflammation and (2) impairs the ability of the same B cells to be stimulated with mitogens or antigens. See Frasca, D. et al., Journal of Immunology 188(1):279-286 (2012). Thus, the immune response in subjects suffering from aging frailty is impaired for a number of reasons.

Non-Ischemic Dilated Cardiomyopathy (NIDCM)

Non-ischemic dilated cardiomyopathy (NIDCM) is a progressive disorder with no current cure, often culminating in heart transplantation. See Felker, G. M. et al., The New England Journal of Medicine 342:1077-84 (2000) and Kirklin, J. K. et al., J. Heart Lung Transplant. 35:407-412 (2016). NIDCM is a disorder with a major component of immune dysregulation as an underlying etiology. See Efthimiadis, I. et al., Hippokratia 15:335-342 (2011) and Meng, X. et al., Nature Reviews Cardiology 13:167-79 (2016). Cell-based therapy for heart disease is a promising new treatment strategy undergoing evaluation, with a major challenge and opportunity in developing allogeneic therapy. See Patel, A. N. et al., Lancet 387:2412-21 (2016); Assmus, B. et al., The New England Journal of Medicine 355:1222-32 (2006); Hare, J. M. et al., J. Am. Coll. Cardiol. 54:2277-86 (2009); Heldman, A. W. et al., JAMA 311:62-73 (2014); Perin, E. C. et al., JAMA 307:1717-26 (2012); Golpanian, S. et al., Physiol. Rev. 96:1127-68 (2016); and Hare, J. M. et al., JAMA 308:2369-79 (2012).

Mesenchymal Stem Cells

Mesenchymal stem cells are multipotent cells able to migrate to sites of injury, while also being immunoprivileged by not detectably expressing major histocompatibility complex class II (MHC-II) molecules, and expressing MHC-I molecules at low levels. See Le Blanc, K. et al., Lancet 371(9624)1579-1586 (2008) and Klyushnenkova E. et al., J. Biomed. Sci. 12(1):47-57 (2005). As such, allogeneic mesenchymal stem cells hold great promise for therapeutic and regenerative medicine, and have been repeatedly shown to have a high safety and efficacy profile in clinical trials for multiple disease processes. See Hare, J. M. et al., Journal of the American College of Cardiology 54(24): 2277-2286 (2009); Hare, J. M. et al., Tex. Heart Inst. J. 36(2):145-147 (2009); and Lalu, M. M. et al., PloS One 7(10):e47559 (2012). They have also been shown to not undergo malignant transformation after transplantation into patients. See Togel F. et al., *American Journal of Physiology Renal Physiology* 289(1):F31-F42 (2005). Treatment with mesenchymal stem cells has been shown to ameliorate severe graft-versus-host disease, protect against ischemic acute renal failure, contribute to pancreatic islet and renal glomerular repair in diabetes, reverse fuliminant hepatic failure, regenerate damaged lung tissue, attenuate sepsis, and reverse remodeling and improve cardiac function after myocardial infarction. See Le Blanc K. et al., *Lancet* 371(9624): 1579-1586 (2008); Hare, J. M. et al., *Journal of the American College of Cardiology* 54(24):2277-2286 (2009); Togel F. et al., *American Journal of Physiology Renal Physiology* 289(1):F31-F42 (2005); Lee R. H. et al., *PNAS* 103(46): 17438-17442 (2006); Parekkadan, B. et al., *PloS One* 2(9): e941(2007); ishizawa K. et al., *FEBS Letters* 556(1-3):249-252 (2004); Nemeth K. et al., *Nature Medicine* 15(1):42-49 (2009); Iso Y. et al., *Biochem. Biophys. Res. Comm.* 354(3): 700-706 (2007); Schuleri K. H. et al., *Eur. Hearth J.* 30(22):2722-2732 (2009); and Heldman A. W. et al., *JAMA* 311(1):62-73 (2014). Furthermore, mesenchymal stem cells are also a potential source of multiple cell types for use in tissue engineering. See Gong Z. et al., *Methods in Mol. Bio.* 698:279-294 (2011); Price, A. P. et al., *Tissue Engineering Part A* 16(8):2581-2591 (2010); and Togel F. et al., *Organogenesis* 7(2):96-100 (2011).

Mesenchymal stem cells have immuno-modulatory capacity. They control inflammation and the cytokine production of lymphocytes and myeloid-derived immune cells without evidence of immunosuppressive toxicity and are hypo-immunogenic. See Bernardo M. E. et al., *Cell Stem Cell* 13(4):392-402 (2013).

Mesenchymal stem cells also have the capacity to differentiate not only into cells of mesodermal origin, but into cells of endodermal and ectodermal origin. See Le Blanc K. et al., *Exp. Hematol.* 31(10):890-896 (2003). For example, in vitro, mesenchymal stem cells cultured in airway growth media differentiate to express lung-specific epithelial markers, e.g., surfactant protein-C, Clara cell secretory protein, and thyroid transcription factor-1. See Jiang Y. et at., *Nature* 418(6893):41-49 (2002) and Kotton D. N. et al., *Development* 128(24):5181-5188 (2001).

In vivo studies have shown that human mesenchymal stem cells undergo site-specific differentiation into various cell types, including myocytes and cardiomyocytes, when transplanted into fetal sheep. See Airey J. A. et al., *Circulation* 109(11):1401-1407 (2004). These mesenchymal stem cells can persist for as long as 13 months in multiple tissues after transplantation in non-immunosuppressed immunocompetent hosts. Other in vivo studies using rodents, dogs, goats, and baboons similarly demonstrate that human mesenchymal stem cells xenografts do not evoke lymphocyte proliferation or systemic allo-antibody production in the recipient. See Klyushnenkova E. et al., *J. Biomed. Sci.* 12(1):17-57 (2005); Aggarwal S. et at., *Blood* 105(4)1815-22 (2005); Augello A. et al., *Arthritis and Rheumatism* 56(4):1175-86 (2007); Bartholomew A. et al., *Exp Hematol.* 30(1):42-48. (2002); Dokic J. et al., *European Journal of Immunology* 43(7):1862-72 (2013); Gerdoni E. et al., *Annals of Neurology* 61(3):219-227 (2007); Lee S. H. et al., *Respiratory Research* 11:16 (2010); Urban V. S. et al., *Stem Cells* 26(1):244-253 (2008); Yang H. et al., *PloS One* 8(7): e69129 (2013); Zappia E. et al., *Blood* 106(5):1755-1761 (2005); Bonfield T. L. et al., *American Journal of Physiology Lung Cellular and Molecular Physiology* 299(6): L760-70 (2010); Glenn J. D. et al., *World Journal of Stem Cells.* 6(5):526-39 (2014); Guo K. et al., *Frontiers in Cell and Developmental Biology* 2:8 (2014); Puissant B. et al., *British Journal of Haematology* 129(1):118-129 (2005); and Sun L. et al., *Stem Cells* 27(6):1421-32 (2009). Taken as a whole, these repeated finding of allogeneic safety and efficacy solidify the notion for using mesenchymal stem cells as an allograft for successful tissue regeneration.

However, despite being a safe therapeutic agent, mesenchymal stem cells are reported in the literature to exert a suppressive effect on antibody production as well as proliferation and maturation of B cells. See Uccelli A. et al. *Trends in Immunology* 28(5):219-226 (2007). Mesenchymal stem cells are also reported to inhibit the generation and function of antigen presenting cells. See Hoogduijin M. J. et al., *Int. Immunopharmacology* 10(12).1496-1500 (2010). Finally, mesenchymal stem cells are reported to suppress $CD4^+$ and $CD8^+$ T cell proliferation. See Ghannam S. et al., *Stem Cell Res. & Ther.* 1:2 (2010). Finally, some preclinical data indicates a higher risk of immunological clearance with administration of allogeneic mesenchymal stem cells as compared to the administration of autologous mesenchymal stem cells. See, e.g., Huang, X. P. et al., *Circulation* 122: 2419-29 (2010).

SUMMARY

Surprisingly, despite the reports of mesenchymal stem cells having a suppressive effect on aspects of the immune system, the present inventors discovered a method of treating non-ischemic dilated cardiomyopathy in a subject, comprising administering a therapeutically effective amount of a population of isolated allogeneic human mesenchymal stem cells to a subject in need thereof. The present inventors also discovered a method of treating symptoms of aging frailty in a subject, comprising administering a therapeutically effective amount of a population of isolated allogeneic human mesenchymal stem cells to a subject in need thereof. The present inventors identified several biomarkers specific for non-ischemic dilated cardiomyopathy and aging frailty including, but not limited to, the levels of exhausted B cells ($CD19^+$, $CD27^+$, $IgD^-$), the levels of switched memory B cells ($CD19^+$, $CD27^{high}$, $IgD^-$), the levels of B-cells expressing intracellular TNF-$\alpha$, the levels of early activated T-cells ($CD3^+$, $CD69^+$), the levels of chronic activated T-cells ($CD3^+$, $CD25^+$), the levels of Temra cells ($CD45RA^+$, $CCR7^-$), the $CD4^+$:$CD8^+$ T cell ratio, and the TNF-$\alpha$ concentration in serum.

One aspect of the invention relates to a method of treating non-ischemic dilated cardiomyopathy in a subject, comprising administering a therapeutically effective amount of a population of isolated allogeneic human mesenchymal stem cells to a subject in need thereof, wherein the number of exhausted B cells ($CD19^+$, $CD27^+$, $IgD^-$) in a sample of the subject' serum decreases by at least 25% as compared to the number of exhausted B cells in a sample of the subject's serum prior to administration of the population of isolated allogeneic human mesenchymal stem cells, thereby treating the non-ischemic dilated cardiomyopathy.

Another aspect of the invention relates to a method of treating non-ischemic dilated cardiomyopathy in a subject, comprising administering a therapeutically effective amount of a population of isolated allogeneic human mesenchymal stem cells to a subject in need thereof, wherein the number of switched memory B cells ($CD19^+$, $CD27^{high}$, $IgD^-$) in a sample of the subject's serum increases by at least 100% as compared to the number of switched memory B cells in a sample of the subject's serum prior to administration of the population of isolated allogeneic human mesenchymal stem cells, thereby treating the non-ischemic dilated cardiomyopathy.

Another aspect of the invention relates to a method of treating non-ischemic dilated cardiomyopathy in a subject, comprising administering a therapeutically effective amount of a population of isolated allogeneic human mesenchymal stem cells to a subject in need thereof, wherein the number of B-cells expressing intracellular TNF-α in a sample of the subject's serum decreases by at least 30% as compared to the number of B-cells expressing intracellular TNF-α. in a sample of the subject's serum prior to administration of the population of isolated allogeneic human mesenchymal stem cells, thereby treating the non-ischemic dilated cardiomyopathy.

Another aspect of the invention relates to a method of treating non-ischemic dilated cardiomyopathy in a subject, comprising administering a therapeutically effective amount of a population of isolated allogeneic human mesenchymal stem cells to a subject in need thereof, wherein the number of early activated T-cells ($CD3^+$, $CD69^+$) in a sample of the subject's serum decreases by at least 30% as compared to the number of early activated T-cells in a sample of the subject's serum prior to administration of the population of isolated allogeneic human mesenchymal stem cells, thereby treating the non-ischemic dilated cardiomyopathy.

Another aspect of the invention relates to a method of treating non-ischemic dilated cardiomyopathy in a subject, comprising administering a therapeutically effective amount of a population of isolated allogeneic human mesenchymal stem cells to a subject in need thereof, wherein the number of chronic activated T-cells ($CD3^+$, $CD25^+$) in a sample of the subject's serum decreases by at least 70% as compared to the number of chronic activated T-Cells in a sample of the subject's serum prior to administration of the population of isolated allogeneic human mesenchymal stem cells, thereby treating the non-ischemic dilated cardiomyopathy.

Another aspect of the invention relates to a method of treating non-ischemic dilated cardiomyopathy in a subject, comprising administering a therapeutically effective amount of a population of isolated allogeneic human mesenchymal stem cells to a subject in need thereof, wherein the number of Temra cells ($CD45RA^+$, $CCR7^-$) in a sample of the subject's serum decreases by at least 40% as compared to the number of Temra cells in a sample of the subject's serum prior to administration of the population of isolated allogeneic human mesenchymal stem cells, thereby treating the non-ischemic dilated cardiomyopathy.

Another aspect of the invention relates to a method of treating non-ischemic dilated cardiomyopathy in a subject, comprising administering a therapeutically effective amount of a population of isolated allogeneic human mesenchymal stem cells to a subject in need thereof, wherein the TNF-α concentration in a sample of the subject's serum decreases by at least 80% as compared to the TNF-α concentration in a sample of the subject's serum prior to administration of the population of isolated allogeneic human mesenchymal stem cells, thereby treating the non-ischemic dilated cardiomyopathy.

Another aspect of the invention relates to a method of treating symptoms of aging frailty in a subject, comprising administering a therapeutically effective amount of a population of isolated allogeneic human mesenchymal stem cells to a subject in need thereof, wherein the number of exhausted B cells ($CD19^+$, $CD27^+$, $IgD^-$) in a sample of the subject' serum decreases by at least 10% as compared to the number of exhausted B cells in a sample of the subject's serum prior to administration of the population of isolated allogeneic human mesenchymal stem cells, thereby treating the symptoms of aging frailty.

Another aspect of the invention relates to a method of treating symptoms of aging frailty in a subject, comprising administering a therapeutically effective amount of a population of isolated allogeneic human mesenchymal stem cells to a subject in need thereof, wherein the number of switched memory B cells ($CD19^+$, $CD27^{high}$, $IgD^-$) in a sample of the subject's serum increases by at least 75% as compared to the number of switched memory B cells in a sample of the subject's serum prior to administration of the population of isolated allogeneic human mesenchymal stem cells, thereby treating the symptoms of aging frailty.

Another aspect of the invention relates to a method of treating symptoms of aging frailty in a subject, comprising administering a therapeutically effective amount of a population of isolated allogeneic human mesenchymal stem cells to a subject in need thereof, wherein the number of B-cells expressing intracellular TNF-α in a sample of the subject's serum decreases by at least 60% as compared to the number of B-cells expressing intracellular TNF-α in a sample of the subject's serum prior to administration of the population of isolated allogeneic human mesenchymal stem cells, thereby treating the symptoms of aging frailty.

Another aspect of the invention relates to a method of treating symptoms of aging frailty in a subject, comprising administering a therapeutically effective amount of a population of isolated allogeneic human mesenchymal stem cells to a subject in need thereof, wherein the number of early activated T-cells ($CD3^+$, $CD69^+$) in a sample of the subject's serum decreases by at least 30% as compared to the number of early activated T-cells in a sample of the subject's serum prior to administration of the population of isolated allogeneic human mesenchymal stem cells, thereby treating the symptoms of aging frailty.

Another aspect of the invention relates to a method of treating symptoms of aging frailty in a subject, comprising administering a therapeutically effective amount of a population of isolated allogeneic human mesenchymal stem cells to a subject in need thereof, wherein the number of chronic activated T-cells ($CD3^+$, $CD25^+$) in a sample of the subject's serum decreases by at least 75% as compared to the number of chronic activated T-Cells in a sample of the subject's serum prior to administration of the population of isolated allogeneic human mesenchymal stem cells, thereby treating the symptoms of aging frailty.

Another aspect of the invention relates to a method of treating symptoms of aging frailty in a subject, comprising administering a therapeutically effective amount of a population of isolated allogeneic human mesenchymal stem cells to a subject in need thereof, wherein the number of Temra cells ($CD45RA^+$, $CCR7^-$) in a sample of the subject's serum decreases by at least 20% as compared to the number of Temra cells in a sample of the subject's serum prior to administration of the population of isolated allogeneic human mesenchymal stem cells, thereby treating the symptoms of aging frailty.

Another aspect of the invention relates to a method of treating symptoms of aging frailly in a subject, comprising administering a therapeutically effective amount of a population of isolated allogeneic human mesenchymal stem cells to a subject in need thereof, wherein the TNF-α concentration in a sample of the subject's serum decreases by at least 50% as compared to the TNF-α concentration in a sample of the subject's serum prior to administration of the population of isolated allogeneic human mesenchymal stem cells, thereby treating the symptoms of aging frailty.

Another aspect of the invention relates to a method of treating symptoms of aging frailly in a subject, comprising administering a therapeutically effective amount of a population of isolated allogeneic human mesenchymal stem cells to a subject in need thereof, wherein the $CD4^+$:$CD8^+$ T cell ratio in a sample of the subject's serum increases by at least 100% as compared to the $CD4^+$:$CD8^+$ T cell ratio in a sample of the subject's serum prior to administration of the population of isolated allogeneic human mesenchymal stem cells, thereby treating the symptoms of aging frailty.

In one embodiment of the invention, the subject is a human. In another embodiment of the invention, the subject is a human who exhibits inflammaging.

In one embodiment of the invention, the mesenchymal stem cells are bone marrow-derived mesenchymal stem cells. In one embodiment of the invention, the mesenchymal stein cells do not express STRO-1. In another embodiment of the invention, the mesenchymal stem cells do not express CD45. In another embodiment of the invention, the mesenchymal stem cells do not express fibroblast surface markers or have a fibroblast morphology. In another embodiment of the invention, the mesenchymal stem cells are not genetically manipulated.

In another embodiment of the invention, the isolated population of allogeneic mesenchymal stem cells is administered in a single dose. In another embodiment of the invention, the isolated population of allogeneic mesenchymal stein cells is administered in multiple doses, e.g., two or more doses. In another embodiment of the invention, the isolated population of allogeneic mesenchymal stem cells is administered at least yearly.

In one embodiment, the isolated population of allogeneic mesenchymal stem cells is administered systemically. In one embodiment of the invention, the isolated population of allogeneic mesenchymal stem cells is administered by infusion or direct injection. In one embodiment of the invention, the isolated population of allogeneic mesenchymal stem cells is administered intravenously, intraarterially, intramuscularly, intraperitoneally, subcutaneously, intradermally, orally, transendocardially, or intranasally. In a further embodiment, the isolated population of allogeneic mesenchymal stem cells is administered intravenously. In a further embodiment, the isolated population of allogeneic mesenchymal stem cells is administered intramuscularly.

In one embodiment of the invention, the isolated population of allogeneic mesenchymal stem cells is administered at a dose of about $20 \times 10^6$ mesenchymal stem cells. In another embodiment of the invention, the isolated population of allogeneic mesenchymal stein cells is administered at a dose of about $100 \times 10^6$ mesenchymal stem cells. In another embodiment of the invention, the isolated population of allogeneic mesenchymal stem cells is administered at a dose of about $200 \times 10^6$ mesenchymal stem cells.

In one embodiment of the invention, the isolated population of allogeneic mesenchymal stem cells are obtained from a human donor and wherein a step of MHC matching of the human donor to the subject is not employed prior to the administration of the isolated population of allogeneic mesenchymal stem cells to the subject.

Another aspect of the invention relates to a method of evaluating cellular and humoral immunity status in a subject, comprising:

(1) obtaining a serum sample from a subject selected for evaluation based on a determination that the subject was previously in need of treatment of non-ischemic dilated cardiomyopathy and the subject had been administered an initial dose of an isolated population of allogeneic human mesenchymal stem cells;

(2) performing one or more assays configured to detect a non-ischemic dilated cardiomyopathy marker selected from the group of exhausted B cells ($CD19^+$, $CD27^+$, $IgD^-$), switched memory B cells ($CD19^+$, $CD27^{high}$, $IgD^-$), B-cells expressing intracellular TNF-α, early activated T-cells ($CD3^+$, $CD69^+$), chronic activated T-cells ($CD3^+$, $CD25^+$), Temra cells ($CD45RA^+$, $CCR7^-$), and serum TNF-α by introducing the serum sample obtained from the subject into an assay instrument which (i) contacts the serum sample with one or more antibodies which specifically bind for detection the biomarker(s) which are assayed, and (ii) generates one or more assay results indicating of binding of each biomarker which is assayed to a respective antibody to provide one or more assay results;

(3) correlating the assay result(s) generated by the assay instrument to the immunity status of the subject, wherein the correlating step comprises assigning a likelihood of one or more future changes in immune status to the subject based on the assay result(s); and (4) treating the subject based on the predetermined subpopulation of individuals to which the subject is assigned, wherein the treatment comprises administration of one or more additional doses of an isolated population of allogeneic human mesenchymal stem cells, Another aspect of the invention relates to a method of evaluating cellular and humoral immunity status in a subject, comprising:

(1) obtaining a serum sample from a subject selected for evaluation based on a determination that the subject was previously in need of treatment of symptoms of aging frailty and the subject had been administered an initial dose of an isolated population of allogeneic human mesenchymal stem cells;

(2) perforating one or more assays configured to detect aging frailty marker selected from the group of exhausted B cells ($CD19^+$, $CD27^+$, $IgD^-$), switched memory B cells ($CD19^+$, $CD27^{high}$, $IgD^-$), B-cells expressing intracellular TNF-α, early activated T-cells ($CD3^+$, $CD69^+$), chronic activated T-cells ($CD3^+$, $CD25^+$), Temra cells ($CD45RA^+$, $CCR7^-$), the $CD4^+$:$CD8^+$ T cell ratio, and serum TNF-α by introducing the serum sample obtained from the subject into an assay instrument which (i) contacts the serum sample with one or more antibodies which specifically bind for detection the biomarker(s) which are assayed, and (ii) generates one or more assay results indicating of binding of each biomarker which is assayed to a respective antibody to provide one or more assay results;

(3) correlating the assay result(s) generated by the assay instrument to the immunity status of the subject, wherein the correlating step comprises assigning a likelihood of one or more future changes in immune status to the subject based on the assay result(s); and (4) treating the subject based on the predetermined subpopulation of individuals to which the subject is assigned, wherein the treatment comprises administration of one or more additional doses of an isolated population of allogeneic human mesenchymal stem cells.

In one embodiment of the invention, one or more future changes in immune status comprise one or more of an increase in the number of exhausted B cells ($CD19^+$, $CD27^-$, IgD⁻), a decrease in the number of switched memory B cells (CD19⁺, CD27$^{high}$, IgD⁻), an increase in the number of B-cells expressing intracellular TNF-α, an increase in the number of early activated T-cells (CD3⁺, CD69⁺), an increase in the number of chronic activated T-cells (CD3⁺, CD25⁺), an increase in the number of Temra cells (CD45RA⁺, CCR7⁻), a decrease in the CD4⁺:CD8⁺ T cell ratio, and an increase in serum TNF-α.

Another aspect of the invention relates to an in vitro method of determining efficacy of treatment of non-ischemic dilated cardiomyopathy in a subject comprising: determining the levels of one or more biomarkers selected from the group consisting of exhausted B cells (CD19⁺, CD27⁻IgD⁻), switched memory B cells (CD19⁺, CD27$^{high}$, IgD⁻), B-cells expressing intracellular TNF-α, early activated T-cells (CD3⁺, CD69⁺), chronic activated T-cells (CD3⁺, CD25⁺), Temra cells (CD45RA⁺, CCR7⁻), and the TNF-α concentration in serum obtained from the subject before and after administration of a population of isolated allogeneic human mesenchymal stem cells to the subject, and comparing the levels of the one or more biomarkers in the serum obtained before and after administration of the population of isolated human mesenchymal stem cells, wherein treatment is efficacious if (1) the number of exhausted B cells (CD19⁺, CD27⁻, IgD⁻) decreases by at least 25% as compared to the number of exhausted B cells prior to administration of the population of isolated allogeneic human mesenchymal stem cells, (2) the number of switched. memory B cells (CD19⁺, CD27$^{high}$, IgD⁻) increases by at least 100% as compared to the number of switched memory B cells prior to administration of the population of isolated allogeneic human mesenchymal stem cells, (3) the number of B-cells expressing intracellular TNF-α decreases by at least 30% as compared to the number of B-cells expressing intracellular TNF-α prior to administration of the population of isolated allogeneic human mesenchymal stem cells, (4) the number of early activated T-cells (CD3⁺, CD69⁺) decreases by at least 30% as compared to the number of early activated T-cells prior to administration of the population of isolated allogeneic human mesenchymal stem cells, (5) the number of chronic activated T-cells (CD3⁺, CD25⁺) decreases by at least 70% as compared to the number of chronic activated T-Cells prior to administration of the population of isolated allogeneic human mesenchymal stem cells, (6) the number of Temra cells (CD45RA⁺, CCR7⁻) decreases by at least 40% as compared to the number of Temra cells prior to administration of the population of isolated allogeneic human mesenchymal stem cells, and/or (7) the TNF-α concentration in a sample of the subject's serum decreases by at least 80% as compared to the TNF-α concentration in a sample of the subject's serum prior to administration of the population of isolated allogeneic human mesenchymal stem cells.

Another aspect of the invention relates to an in vitro method of determining efficacy of treatment of symptoms of aging frailty in a subject comprising: determining the levels of one or more biomarkers selected from the group consisting of exhausted B cells (CD19⁺, CD27⁻, IgD⁻), switched memory B cells (CD19⁺, C27$^{high}$, IgD⁻) B-cells expressing intracellular TNF-α, early activated T-cells (CD3⁺, CD69⁺), chronic activated T-cells (CD3⁺, CD25⁺), Temra cells (CD45RA⁺, CCR7⁻), the CD4⁺:CD8⁺ T cell ratio, and the TNF-α concentration in serum obtained from the subject before and after administration of a population of isolated allogeneic human mesenchymal stem cells to the subject, and comparing the levels of the one or more biomarkers in the serum obtained before and after administration of the population of isolated human mesenchymal stem cells, wherein treatment is efficacious if (1) the number of exhausted B cells (CD19⁺, CD27⁻, IgD⁻) decreases by at least 10% as compared to the number of exhausted B cells prior to administration of the population of isolated allogeneic human mesenchymal stem cells, (2) the number of switched memory B cells (CD19⁺, CD27$^{high}$, IgD⁻) increases by at least 75% as compared to the number of switched memory B cells prior to administration of the population of isolated allogeneic human mesenchymal stem cells, (3) the number of B-cells expressing intracellular TNF-α decreases by at least 60% as compared to the number of B-cells expressing intracellular TNF-α prior to administration of the population of isolated allogeneic human mesenchymal stem cells, (4) the number of early activated T-cells (CD3⁺, CD69⁺) decreases by at least 30% as compared to the number of early activated T-cells prior to administration of the population of isolated allogeneic human mesenchymal stem cells, (5) the number of chronic activated T-cells (CD3⁺, CD25⁺) decreases by at least 75% as compared to the number of chronic activated T-Cells prior to administration of the population of isolated allogeneic human mesenchymal stem cells, (6) the number of Temra cells (CD45RA⁺, CCR7⁻) decreases by at least 20% as compared to the number of Temra cells prior to administration of the population of isolated allogeneic human mesenchymal stem cells, (7) the TNF-α concentration in a sample of the subject's serum decreases by at least 50% as compared to the TNF-α concentration in a sample of the subject's serum prior to administration of the population of isolated allogeneic human mesenchymal stem cells, and/or (8) the CD4+:CD8+ T cell ratio in a sample of the subjects serum increases by at least 100% as compared to the CD4+:CD8+ T cell ratio in a sample of the subject's serum prior to administration of the population of isolated allogeneic human mesenchymal stem cells.

Another aspect of the invention relates to the use in vitro of the levels of exhausted B cells (CD19⁺, CD27⁻, IgD⁻), the levels of switched memory B cells (CD19⁺, CD27$^{high}$, IgD⁻), the levels of B-cells expressing intracellular TNF-α, the levels of early activated T-cells (CD3⁺, CD69⁺), the levels of chronic activated T-cells (CD3⁺, CD25⁺), the levels of Temra cells (CD45RA⁺, CCR7⁻), and the TNF-α concentration in serum for determining whether treatment for non-ischemic dilated cardiomyopathy is efficacious.

Another aspect of the invention relates to the use in vitro of the levels of exhausted B cells (CD19⁺, CD27⁻, IgD⁻), the levels of switched memory B cells (CD19⁺, CD27$^{high}$, IgD⁻), the levels of B-cells expressing intracellular TNF-α, the levels of early activated T-cells (CD3⁺, CD69⁺), the levels of chronic activated T-cells (CD3⁺, CD25⁺), the levels of Temra cells (CD45RA⁺, CCR7⁻), the CD4⁺:CD8⁺ T cell ratio, and the TNF-α concentration in serum for determining whether treatment for aging frailty is efficacious.

BRIEF DESCRIPTION OF THE FIGURES

FIG. 2 provides baseline patient characteristics for subjects enrolled in the randomized, double-blinded, placebo-controlled study investigating the use of allogeneic mesenchymal stem cells for the treatment of older individuals with frailty.

DETAILED DESCRIPTION

Figure 1:
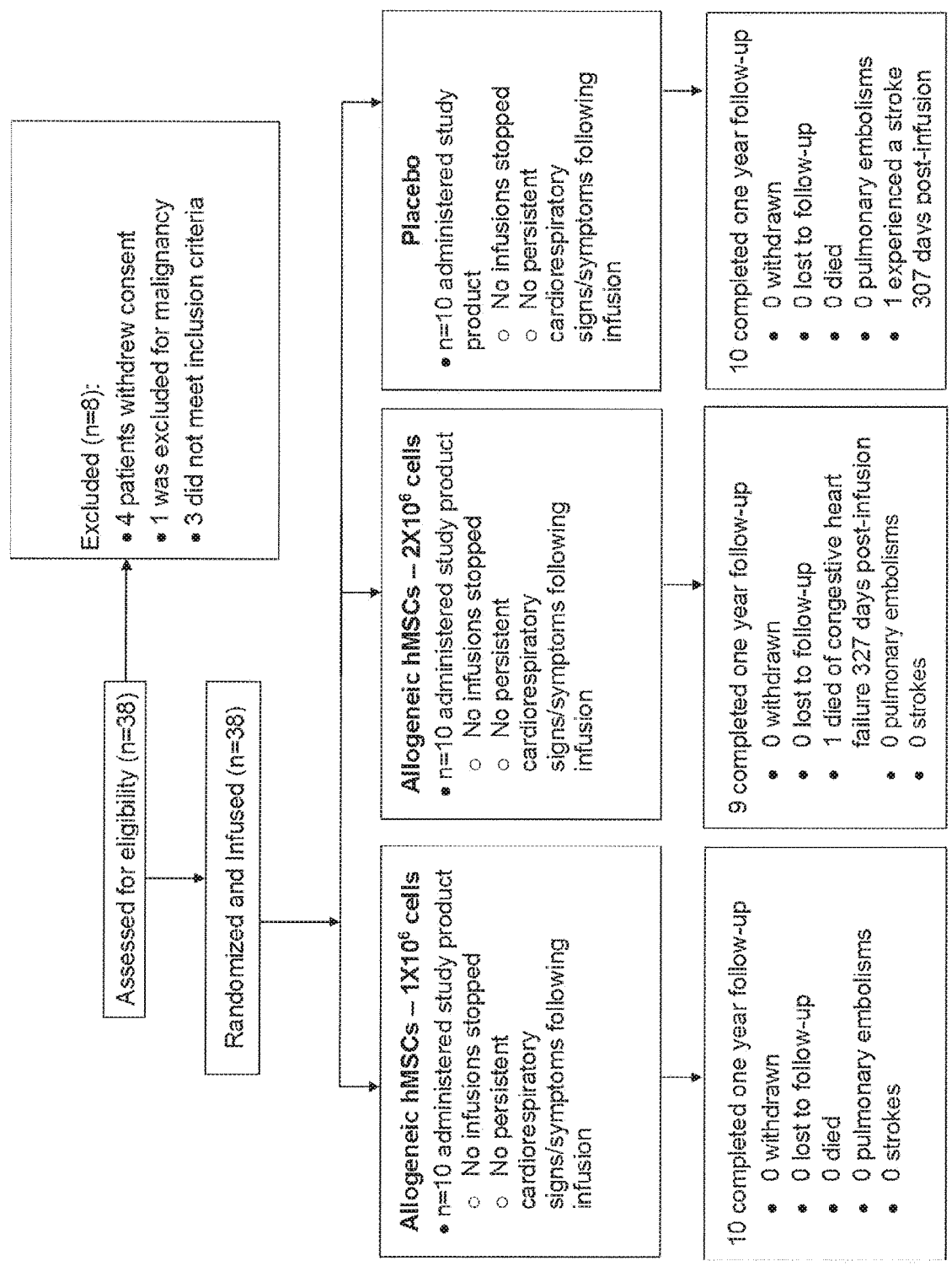
FIG. 1 is a Consort Diagram for a randomized, double-blinded, placebo-controlled study investigating the use of allogeneic mesenchymal stem cells for the treatment of older individuals with frailty.

In certain embodiments, the present invention is directed to methods of treating non-ischemic dilated cardiomyopathy in a subject, comprising administering a therapeutically effective amount of a population of isolated allogeneic human mesenchymal stem cells to a subject in need thereof. The examples demonstrate that in vivo administration of isolated populations of allogeneic human mesenchymal stem cells result in an increase in the percentage of switched memory B cells and a decrease in exhausted B cells in subjects. The examples also demonstrate that in vivo administration of isolated allogeneic human mesenchymal stem cells results in an improvement in the $CD4^+$:$CD8^+$ T cell ratio in subjects. Also, as shown in the examples, the levels of B-cells expressing intracellular TNF-α, the levels of early activated T-cells ($CD3^+$, $CD69^+$), the levels of chronic activated T-cells ($CD3^+$, $CD25^+$), the levels of Temra cells ($CD45RA^+$, $CCR7^-$), and the TNF-α, concentration in serum is reduced in subjects having received infusions of allogeneic human mesenchymal stem cells. From these unexpected results, the present inventors determined that isolated allogeneic human mesenchymal stem cells favorably altered several immunologic markers typically elevated in chronic inflammation. Restoration of immune competence has clinical relevant in subject who are of higher risk for co-morbid infectious disease.

In other embodiments, the present invention is directed to methods of treating symptoms of aging frailty in a subject, comprising administering a therapeutically effective amount of a population of isolated allogeneic human mesenchymal stem cells to a subject in need thereof. The examples demonstrate that in vivo administration of isolated populations of allogeneic human mesenchymal stem cells result in an increase in the percentage of switched memory B cells and a decrease in exhausted B cells in subjects. The examples also demonstrate that in vivo administration of isolated allogeneic human mesenchymal stem cells results in an improvement in the $CD4^+$:$CD8^+$ T cell ratio in subjects. Also, as shown in the examples, the levels of B-cells expressing intracellular TNF-α, the levels of early activated T-cells ($CD3^+$, $CD69^+$), the levels of chronic activated T-cells ($CD3^+$, $CD25^+$), the levels of Temra cells ($CD45RA^+$, $CCR7^-$), and the TNF-α concentration in serum is reduced in subjects having received infusions of allogeneic human mesenchymal stem cells. From these unexpected results, the present inventors determined that isolated allogeneic human mesenchymal stem cells are effective at reducing inflammaging, a prevalent feature in aging frailty.

Definitions

Embodiments may be practiced without the theoretical aspects presented. Moreover, the theoretical aspects are presented with the understanding that the embodiments are not bound by any theory presented.

Unless otherwise defined, all (including technical and scientific terms) used herein have the same meaning as commonly understood by one of ordinary skill in the art. it will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should he construed as indicating any non-claimed element as essential to the practice of the invention.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of ±10% of the referenced value.

Dosage, Duration and Subjects

"A therapeutically effective amount" means an amount that stimulates a B- or T-cell dependent immune response. Such a response is characterized by the ability to elicit significant levels of IgG and opsonic activity. The dosage and number of doses (e.g., single or multiple dose) administered to the subject will vary depending upon a variety of factors, including the route of administration, patient conditions and characteristics (sex, age, body weight, health, size), extent of symptoms, concurrent treatments, frequency of treatment and the effect desired, and the like.

In one embodiment of the invention, the isolated population of allogeneic mesenchymal stem cells is administered as a single dose. In another embodiment, the isolated population of allogeneic mesenchymal stem cells is administered in multiple doses, e.g., two or more doses. In other embodiments, the isolated population of allogeneic mesenchymal stem cells is administered at least yearly.

In another embodiment of the invention, the administration of the isolated population of allogeneic mesenchymal stem cells is repeated, such as at least 1, 2, 3, 4, 5, 6, 8, 9, 10, 11, 12, 13, 14, 15, 16, 17, or 18 months after the first administration of the isolated population of allogeneic mesenchymal stem cells, or repeated between 2-4, 2-6, 2-8, 2-10, 3-4, 3-6, 3-8, 3-10, 4-6, 4-8, 4-10, 6-8, 6-10, 6-12, or 12-18 months after the first administration of the isolated. population of allogeneic mesenchymal stem cells.

In one embodiment of the invention, the isolated population of allogeneic mesenchymal stem cells is administered at a dose of about $1 \times 10^6$, $2 \times 10^6$, $5 \times 10^6$, $10 \times 10^6$, $20 \times 10^6$, $30 \times 10^6$, $40 \times 10^6$, $50 \times 10^6$, $60 \times 10^6$, $70 \times 10^6$, $80 \times 10$, $90 \times 10^6$, $100 \times 10^6$, $110 \times 10^6$ $120 \times 10^6$, $130 \times 10^6$, $140 \times 10^6$, $150 \times 10^6$, $160 \times 10^6$, $170 \times 10^6$, $180 \times 10^6$, $190 \times 10^6$, $200 \times 10^6$, $300 \times 10^6$, $400 \times 10^6$, $500 \times 10^6$, or $10 \times 10^7$ mesenchymal stem cells. in a further embodiment, the isolated population of allogeneic mesenchymal stem cells is administered at a dose of about $20 \times 10^6$ mesenchymal stem cells. In a further embodiment, the isolated population of allogeneic mesenchymal stem cells is administered at a dose of about $100 \times 10^6$ mesenchymal stem cells. In yet a further embodiment, the isolated population of allogeneic mesenchymal stem cells is administered at a dose of about $200 \times 10^6$ mesenchymal stem cells. In further embodiments, the isolated population of allogeneic mesenchymal stem cells is administered at a dose of from about $1$-$400 \times 10^6$, $10$-$400 \times 10^6$, $100$-$400 \times 10^6$, $20$-$200 \times 10^6$, $20$-$400 \times 10^6$, $0.1$-$5 \times 10^6$, $0.1$-$10 \times 10^6$, $0.1$-$100 \times 10^6$, $1$-$50 \times 10^6$, $1$-$100 \times 10^6$, $0.01$-$10 \times 10^6$ or $0.01$-$100 \times 10^6$ mesenchymal stem cells.

In some embodiments, the therapeutically effective amount of the isolated population of allogeneic mesenchymal stem cells is sufficient to increase the ratio of $CD4^+$:$CD8^+$ T cells in a subject, such as to increase the ratio of $CD4^+$:$CD8^+$ T cells by at least two-, three, four-, five-, or six-fold as compared to the ratio prior to administration of the isolated population of allogeneic mesenchymal stem cells, i.e., an increase in the ratio of $CD4^+$:$CD8^+$ T cells by at least 100%, 200%, 300%, 400%, or 500%.

In some embodiments, the therapeutically effective amount of the isolated population of allogeneic mesenchymal stem cells is sufficient to increase the number of switched memory B cells ($CD19^+$, $CD27^{high}$, $IgD^-$) in a subject, such as to increase the number of switched memory B cells by at least two-, three-, four-, or five-fold as compared to the number prior to administration of the isolated population of allogeneic mesenchymal stem cells, i.e., an increase in the number of switched memory B cells ($CD19^+$, $CD27^{high}$, $IgD^-$) by at least 100%, 200%, 300%, or 400%. In other embodiments, the number of switched memory B cells as compared to the number of such B cells prior to administration of the isolated population of allogeneic mesenchymal stem cells increases by at least 10%, 15%, 20%, 25%, 30%, 35%, 40%, 45%, 50%, 55%, 60%, 65%, 70%, 75%, 80%, 85%, 90%, or 95%.

In some embodiments, the therapeutically effective amount of the isolated population of allogeneic mesenchymal stem cells is sufficient to decrease the number of B cells expressing intracellular TNF-α in a subject, such as to decrease the number by at least two-, three-, four-, five-, or six-fold as compared to the number of such B cells prior to administration of the isolated population of allogeneic mesenchymal stem cells. In other embodiments, the number of B cells expressing intracellular TNF-α as compared to the number of such B cells prior to administration of the isolated population of allogeneic mesenchymal stem cells decreases by at least 10%, 20%, 30%, 40%, 50%, or 60%.

In some embodiments, the therapeutically effective amount of the isolated population of allogeneic mesenchymal stem cells is sufficient to decrease the number of exhausted B cells ($CD19^+$, $CD27^-$, $IgD^-$) in a subject, such as to decrease the number of exhausted B cells by at least two- or three-fold as compared to the number prior to administration of the isolated population of allogeneic mesenchymal stem cells. In other embodiments, the number of exhausted B cells as compared to the number of such B cells prior to administration of the isolated population of allogeneic mesenchymal stem cells decreases by at least 10%, 15%, 20%, 25%, 30%, 35%, 40%, 45%, or 50%.

In some embodiments, the therapeutically effective amount of the isolated population of allogeneic mesenchymal stem cells is sufficient to decrease the number of early activated T-cells ($CD3^+$, $CD69^+$) in a subject, such as to decrease the number of early activated T-cells by at least two- or three-fold as compared to the number prior to administration of the isolated population of allogeneic mesenchymal stem cells. In other embodiments, the number of early activated T-cells as compared to the number of such T cells prior to administration of the isolated population of allogeneic mesenchymal stein cells decreases by at least 10%, 20%, 30%, 40%, or 50%.

In some embodiments, the therapeutically effective amount of the isolated population of allogeneic mesenchymal stem cells is sufficient to decrease the number of chronic activated T-cells (CD3$^+$, CD25$^+$) in a subject, such as to decrease the number of chronic activated T-cells by at least two- or three-fold as compared to the number prior to administration of the isolated population of allogeneic mesenchymal stem cells. In other embodiments, the number of chronic activated T-cells as compared to the number of such T cells prior to administration of the isolated population of allogeneic mesenchymal stein cells decreases by at least 10%, 15%, 20%, 25%, 30%, 35%, 40%, 45%, 50%, 55%, 60%, 65%, 70%, 75%, 80%, 85%, 90%, or 95%.

In some embodiments, the therapeutically effective amount of the isolated population of allogeneic mesenchymal stem cells is sufficient to decrease the number of Temra cells (CD45RA$^+$, CCR7$^-$) in a subject, such as to decrease the number of Temra cells by at least two- or three-fold as compared to the number prior to administration of the isolated population of allogeneic mesenchymal stem cells. In other embodiments, the number of Temra cells as compared to the number of such Temra cells prior to administration of the isolated population of allogeneic mesenchymal stem cells decreases by at least 10%, 20%, 30%, 40%, or 50%.

In some embodiments, the therapeutically effective amount of the isolated population of allogeneic mesenchymal stem cells is sufficient to decrease the TNF-α concentration in a sample of the subject's serum, such as to decrease the TNF-α concentration by at least two- or three-fold as compared to the TNF-α concentration prior to administration of the isolated population of allogeneic mesenchymal stem cells. In other embodiments, the concentration of TNF-α decreases by at least 10%, 20%, 30%, 40%, 50%, 60%, 70%, 80%, or 90%, as compared to the concentration of TNF-α prior to administration of the isolated population of allogeneic mesenchymal stem cells.

Other aspects of the invention include methods for evaluating the cellular and humoral immunity status in subjects to determine if the subjects would benefit from the administration of an isolated population of allogeneic mesenchymal stem cells and treating a predetermined subpopulation of subjects based on biomarker data. For example, one or more assays could be performed to detect a non-ischemic dilated cardiomyopathy marker selected from the group of exhausted B cells (CD19$^+$, CD27$^-$, IgD$^-$), switched memory B cells (CD19$^+$, CD27$^{high}$, IgD$^-$), B-cells expressing intracellular TNF-α, early activated T-cells (CD3$^+$, CD69$^+$), chronic activated T-cells (CD3$^+$, CD25$^+$), Temra cells (CD45RA$^+$, CCR7$^-$), and serum TNF-α. Similarly, one or more assays could be performed to detect an aging frailty marker selected from the group of exhausted B cells (CD19$^+$, CD27$^-$, IgD$^-$) switched memory B cells (CD19$^+$, CD27$^{high}$, IgD$^-$), B-cells expressing intracellular TNF-α, early activated T-cells (CD3$^+$, CD69$^+$), chronic activated T-cells (CD3$^+$, CD25$^+$), Temra cells (CD45RA$^+$, CCR7$^-$), the CD4$^+$:CD8$^+$ T cell ratio, and serum TNF-α.

In some embodiments, treatment is demonstrated to be efficacious when the isolated population of allogeneic mesenchymal stem cells is sufficient to increase the ratio of CD4$^+$:CD8$^+$ T cells in a subject, such as to increase the ratio of CD4$^+$:CD8$^+$ T cells by at least two-, three, four-, five-, or six-fold as compared to the ratio prior to administration of the isolated population of allogeneic mesenchymal stem cells, i.e., an increase in the ratio of CD4$^+$:CD8$^+$ T cells by at least 100%, 200%, 300%, 400%, or 500%.

In some embodiments, treatment is demonstrated to be efficacious when the isolated population of allogeneic mesenchymal stem cells is sufficient to increase the number of switched memory B cells (CD19$^+$, CD27$^{high}$, IgD$^-$) in a subject, such as to increase the number of switched memory B cells by at least two-, three-, four-, or five-fold as compared to the number prior to administration of the isolated population of allogeneic mesenchymal stem cells, i.e., an increase in the number of switched memory B cells (CD19$^+$, CD27$^{high}$, IgD$^-$) by at least 100%, 200%, 300%, or 400%. In other embodiments, the number of switched memory B cells as compared to the number of such B cells prior to administration of the isolated population of allogeneic mesenchymal stem cells increases by at least 10%, 15%, 20%, 25%, 30%, 35%, 40%, 45%, 50%, 55%, 60%, 65%, 70%, 75%, 80%, 85%, 90%, or 95%.

In some embodiments, treatment is demonstrated to be efficacious when the isolated population of allogeneic mesenchymal stem cells is sufficient to decrease the number of B cells expressing intracellular TNF-α in a subject, such as to decrease the number by at least two-, three-, four-, five-, or six-fold as compared to the number of such B cells prior to administration of the isolated population of allogeneic mesenchymal stem cells. In other embodiments, the nwnber of B cells expressing intracellular TNF-α as compared to the number of such B cells prior to administration of the isolated population of allogeneic mesenchymal stem cells decreases by at least 10%, 20%, 30%, 40%, 50%, or 60%.

In some embodiments, treatment is demonstrated to be efficacious when the isolated population of allogeneic mesenchymal stem cells is sufficient to decrease the number of exhausted B cells (CD19$^+$, CD27$^-$, IgD$^-$) in a subject, such as to decrease the number of exhausted B cells by at least two- or three-fold as compared to the number prior to administration of the isolated population of allogeneic mesenchymal stem cells. In other embodiments, the number of exhausted B cells as compared to the number of such B cells prior to administration of the isolated population of allogeneic mesenchymal stem cells decreases by at least 10%, 15%, 20%, 25%, 30%, 35%, 40%, 45%, or 50%.

In some embodiments, treatment is demonstrated to be efficacious when the isolated population of allogeneic mesenchymal stem cells is sufficient to decrease the number of early activated T-cells (CD3$^+$, CD69$^+$) in a subject, such as to decrease the number of early activated T-cells by at least two- or three-fold as compared to the number prior to administration of the isolated population of allogeneic mesenchymal stem cells. In other embodiments, the number of early activated T-cells as compared to the number of such T cells prior to administration of the isolated population of allogeneic mesenchymal stem cells decreases by at least 10%, 20%, 30%, 40%, or 50%.

In some embodiments, treatment is demonstrated to be efficacious when the isolated population of allogeneic mesenchymal stem cells is sufficient to decrease the number of chronic activated T-cells (CD3$^+$, CD25$^+$) in a subject, such as to decrease the number of chronic activated T-cells by at least two- or three-fold as compared to the number prior to administration of the isolated population of allogeneic mesenchymal stein cells. In other embodiments, the number of chronic activated T-cells as compared to the number of such T cells prior to administration of the isolated population of allogeneic mesenchymal stem cells decreases by at least 10%, 15%, 20%, 25%, 30%, 35%, 40%, 45%, 50%, 55%, 60%, 65%, 70%, 75%, 80%, 85%, 90%, or 95%.

In some embodiments, treatment is demonstrated to be efficacious when the isolated population of allogeneic mesenchymal stem cells is sufficient to decrease the number of Temra cells (CD45RA$^+$, CCR7$^-$) in a subject, such as to decrease the number of Temra cells by at least two- or three-fold as compared to the number prior to administration of the isolated population of allogeneic mesenchymal stem cells. In other embodiments, the number of Temra cells as compared to the number of such Temra cells prior to administration of the isolated population of allogeneic mesenchymal stem cells decreases by at least 10%, 20%, 30%, 40%, or 50%.

In some embodiments, treatment is demonstrated to be efficacious when the isolated population of allogeneic mesenchymal stem cells is sufficient to decrease the TNF-α concentration in a sample of the subject's serum, such as to decrease the TNF-α concentration by at least two- or three-fold as compared to the TNF-α concentration prior to administration of the isolated population of allogeneic mesenchymal stem cells. In other embodiments, the concentration of TNF-α decreases by at least 10%, 20%, 30%, 40%, 50%, 60%, 70%, 80%, or 90%, as compared to the concentration of TNF-α prior to administration of the isolated population of allogeneic mesenchymal stem cells.

"Administering" a composition may be accomplished by oral administration, injection, infusion, parenteral, intravenous, mucosa', sublingual, intramuscular, in tradermal, intranasal, intraperitoneal, intraarterial, subcutaneous absorption or by any method in combination with other known techniques. In one embodiment of the invention, the isolated population of allogeneic mesenchymal stem cells is administered systemically. In another embodiment of the invention, the isolated population of allogeneic mesenchymal stem cells is administered by infusion or direct injection. In one embodiment of the invention, the isolated population of allogeneic mesenchymal stem cells is administered intramuscularly, intravenously, intraarteerially, intraperitoneally, subcutaneously, intradermally, orally, transendocardially, or intranasally. In a further embodiment, the isolated population of allogeneic mesenchymal stem cells is administered intramuscularly. In a further embodiment, the isolated population of allogeneic mesenchymal stem cells is administered intravenously.

The term "subject" as used herein includes, but is not limited to, humans and non-human vertebrates such as wild, domestic, and farm animals. In some embodiments, the term refers to humans, such as elderly humans ≥65 years of age, or elderly humans 60-95 years of age. In some embodiments, the human subject exhibits symptoms of aging frailty. In some embodiments, the human subject exhibits inflammaging.

The term "allogeneic" refers to a cell that is of the same animal species but genetically different in one or more genetic loci as the animal that becomes the "recipient host." This usually applies to cells transplanted from one animal to another non-identical animal of the same species.

As used herein, the phrase "in need thereof" means that the subject has been identified as having a need for the particular method or treatment. In some embodiments, the identification can be by any means of diagnosis. In any of the methods and treatments described herein, the subject can be in need thereof. In some embodiments, the subject is in an environment or will be traveling to an environment in which a particular disease, disorder, or condition is prevalent.

Cells are referred to herein as being positive or negative for certain markers. For example, a cell can be negative for CD45, which can also be referred to as CD45$^-$. The superscript notation "$^-$" refers to a cell that is negative for the marker linked to the superscript. In contrast a marker with the "$^+$" refers to a cell that is positive for that marker. For example, a cell that is referenced as "CD8$^+$" is positive for CD8. A "+" can also be used to reference the marker as positive. A "−" can also be used to reference the marker as negative.

As used herein, the term "stem cell" refers to a cell from the embryo, fetus, or adult that has, wider certain conditions, the ability to reproduce itself for long periods or, in the case of adult stem cells, throughout the life of the organism. It also can give rise to specialized cells that make up the tissues and organs of the body.

Mesenchymal stem cells are the formative pluripotent blast cells found inter alia in bone marrow, blood, dermis, and periosteum that are capable of differentiating into any kind of the specific types of mesenchymal or connective tissues (i.e., the tissues of the body that support the specialized elements; particularly adipose, osseous, cartilaginous, elastic, and fibrous connective tissues) depending upon various influences from bioactive factors, such as cytokines.

Certain methods of isolating and/or purifying mesenchymal stem cells have been described herein and are known in the art. In some embodiments, mesenchymal stem cells are isolated from bone marrow of adult humans. In some embodiments, the cells are passed through a density gradient to eliminate undesired cell types. The cells can be plated and cultured in appropriate media. In some embodiments, the cells are cultured for at least one day or about three to about seven days, and removing non-adherent cells. The adherent cells can then be plated and expanded.

Other methods for isolating and culturing stem cells are also known. Placenta is an excellent readily available source for mesenchymal stem cells. Moreover, mesenchymal stem cells can be derivable from adipose tissue and bone marrow stromal cells are speculated to be present in other tissues. While there are dramatic qualitative and quantitative differences in the organs from which adult stem cells can be derived, the initial differences between the cells may be relatively superficial and balanced by the similar range of plasticity they exhibit.

Homogeneous human mesenchymal stem cell compositions are provided which serve as the progenitors for all mesenchymal cell lineages. Mesenchymal stem cells are identified by specific cell surface markers which are identified with unique monoclonal antibodies. The homogeneous mesenchymal stem cell compositions are obtained by positive selection of adherent marrow or periosteal cells which are free of markers associated with either hematopoietic or differentiated mesenchymal cells. These isolated mesenchymal cell populations display epitopic characteristics associated with only mesenchymal stem cells, have the ability to regenerate in culture without differentiating, and have the ability to differentiate into specific mesenchymal lineages when either induced in vitro or placed in vivo at a site of inflammation.

In order to obtain the human mesenchymal stem cells for the compositions, methods, and kits disclosed herein, pluripotent mesenchymal stem cells are separated from other cells in the bone marrow or other mesenchymal stem cell source. Bone marrow cells may be obtained from iliac crest, femora, tibiae, spine, rib, or other medullary spaces. Other spaces of human mesenchymal stem cells include embryonic yolk sac, placenta, umbilical cord, fetal and adolescent skin, and blood.

In some embodiments, the human mesenchymal stem cells are identified by the absence of markers. For example, human mesenchymal stem cells useful in the invention include those that are negative for STRO-1 and/or negative for CD45. Similarly, human mesenchymal stem cells useful in the invention include those that do not express fibroblast surface markers or have a fibroblast morphology.

Methods of Enhancing Immune Responses

As discussed above, the present invention is directed to a method of enhancing a subject's cellular or humoral immune response, comprising administering to the subject therapeutically effective amounts of an isolated population of human mesenchymal stem cells. In some embodiments of the invention, the mesenchymal stem cells are not genetically manipulated. In some embodiments of the invention, the mesenchymal stem cells are obtained from a human donor and wherein a step of MHC matching of the human donor to the subject is not employed prior to the administration of the isolated population of human mesenchymal stem cells.

Compositions for use in the invention may be formulated using any suitable method. Formulation of cells with standard pharmaceutically acceptable carriers and/or excipients may be carried out using routine methods in the pharmaceutical art. The exact nature of a formulation will depend upon several factors including the cells to be administered and the desired route of administration. Suitable types of formulation are fully described in Remington's Pharmaceutical Sciences, 19$^{th}$ Edition, Mack Publishing Company, Eastern Pennsylvania, USA.

Compositions may be prepared together with a physiologically acceptable carrier or diluent. Typically, such compositions are prepared as liquid suspensions of cells. The cells may be mixed with an excipient which is pharmaceutically acceptable and compatible with the active ingredient. Suitable excipients are, for example, water, saline, dextrose, glycerol, of the like and combinations thereof.

In addition, if desired, the pharmaceutical compositions of the invention may contain minor amounts of auxiliary substances such as wetting or emulsifying agents, pH buffering agents, and/or adjuvants which enhance effectiveness. In one embodiment of the invention, the adjuvant comprises human serum albumin (HSA).

One suitable carrier or diluent is PlasniaLyte A™. This is a sterile, nonpyrogenic isotonic solution for intravenous administration. Each 100 mL contains 526 mg of Sodium Chloride, USP (NaCl); 502 mg of Sodium Gluconate ($C_6H_{11}NaO_7$); 368 mg of Sodium Acetate Trihydrate, USP ($C_2H_3NaO_2 \cdot 3H_2O$); 37 mg of Potassium Chloride, USP (KCl); and 30 mg of Magnesium Chloride, USP ($MgCl_2 \cdot 6H_2O$). It contains no antimicrobial agents. The pH is adjusted with sodium hydroxide. The pH is 7.4 (6.5 to 8.0).

In one embodiment of the invention the mesenchymal stem cells are not genetically manipulated. In another embodiment of the invention, the mesenchymal stem cells are cryopreserved. For example, the mesenchymal stem cells can be suspended in cryoprotectant consisting of Hespan® (6% hetastarch in 0.9% sodium chloride) supplemented with 2% HSA and 5% DMSO and then aliquoted into cryopreservation containers for placement in vapor phase nitrogen freezers. In another embodiment, the mesenchymal stem cells may be provided in PlasmaLyte A™ supplemented with 1% HSA.

EXAMPLES

Example 1

Treatment of Chronic Non-Ischemic Dilated Cardiomyopathy

Briefly, thirty-seven patients were randomized to receive either allogeneic or autologous human mesenchymal stem cells in a 1:1 ratio. Patients were recruited between December 2011 and July 2015 at the University of Miami Hospital. Patients (age: 55.8±11.2; 32% female) received human mesenchymal stem cells (100 million) by transendocardial stem cell injection (TESI) in ten left ventricular sites by NOGA Catheter. Treated patients were evaluated at baseline, 30 days, 3-, 6- and 12-months for immune biomarkers.

Patient Population

Patient eligibility was determined after confirmation of diagnosis of NIDCM with an EF of less than 40% and either a left ventricular end diastolic diameter greater than 5.9 cm in male subjects and greater than 5.6 cm in female subjects or a left ventricular end diastolic volume index >125 mL/m$^2$. Thirty-seven patients were randomized to either autologous human mesenchyme stem cells (hMSCs) or allogeneic hMSCs in a ratio of 1:1. Thirty-four patients received study injection; 16 and 18 patients in the auto- and allo-hMSC, respectively. Three patients did not receive the study injection. One patient withdrew consent before treatment. Another patient was recruited but did not receive treatment due to automatic implantable cardioverter-defibrillator placement (n=1), and one patient died before treatment (n=1). The mean age of injected participants was 55.8±11.2, 29% were female, and 35% were Hispanic. The mean years of NIDCM diagnosis before the TESI was 6.1±6.2 years for alto and 6.9±7.3 years for auto patients (p=0.5 between groups). Fifty percent of patients had NYHA class II symptoms, mean baseline global EF was 26.5±9.64%, mean 6MWT was 422±86.8 M, and median baseline MILHFQ scores were 36 (IQR 18.0, 64.0).

Study Procedures and Timeline

Baseline assessments included chemistry and hematology laboratories, echocardiography, and chest, abdominal and pelvic computed tomography scans.

Human Mesenchymal Stem Cells (hMSCs) for Cell Therapy

All allogeneic and autologous human mesenchymal stem cells were manufactured at the University of Miami ISCI. See, e.g., Golpanian, S. et al., *Physiol. Rev.* 96:1127-68 (2016) and Mushtaq, M. et al., *J. Cardio. Trans. Res.* 7:769-80 (2014). Allogeneic human mesenchymal stein cells were derived from Caucasian male donors mean age 25.4±3.3 years and were between 80 to 90% viable at the time of TESI. The auto-hMSCs were from 11 males with a mean age of 58.1±9.9 and six females with a mean age of 55.0±12.4 years.

Transendocardial Stem Cell Injection

Injection sites were selected to prioritize safety of the TESI procedure and to distribute sites throughout the accessible myocardial territories. Considerations for site selection included avoidance of the ventricular apex, and optimization of catheter stability prior to needle extension.

Immune Monitoring

Calculated panel e antibodies (cPRA) were measured at baseline and at six-months using Luminex 200. Serum TNF-α was measured using human TNF-α ELISA high sensitivity kit (eBiosciences). Lymphocytes were stained for T-cell markers of activation. Late/exhausted T-cells, B-cell subsets (Switched memory and Late/Exhausted B-cells) and TNF-α by B-cells. All samples were acquired using the LSR-Fortessa-HTS analyzer (BD Pharmigen) and analyzed with the FlowJo V10 software, i.e., all lymphocyte populations were assessed by flow cytometry and expressed as a percent from gated (B-cell parameters gated on $CD19^+$ and T-cell parameters gated on $CD3^+$).

cPRA results showed that 67% of alto and 92% of auto recipients had no reaction to low cPRA (0-20% cPRA). Twenty-seven % of alto and 8% of auto had a moderate cPRA (21-79% cPRA), and one subject (7%) receiving alto MSCs had a high cPRA response (+80% cPRA).

Elevated baseline levels of TNF-α decreased from baseline to 6-months in both groups (alto: −10.6±1.6 pg/ml, $p<0.0001$, auto: −6.8±1.4 pg/ml, $p<0.0001$, Table 1; between group, p=0.05). Temra T-cells (exhausted T-cell phenotype) were duced in both groups with a greater decrease in alto (alto: −15.9±5.4%, $p<0.0001$, auto: −9.3±3.3%, $p<0.0001$, Table 1; between group, p=0.0111; Table 1). Suppressed % Switch Memory B-cells (predictive biomarker for antibody response) at baseline were significantly increased at six-months in both groups with a greater improvement in alto (alto: +1002±4.9%, $p<0.0001$ vs. auto: +4.3±3.9%, p=0.0014, between group, $p<0.0001$; Table 1). Finally, intracellular TNF-α expression in B23 cells was also decreased at 6-months relative to baseline in both groups (alto: −11.2±3.3%, $p<0.0001$, auto: −8.5±3.0%, $p<0.0001$; between group, p=0.174; Table 1). In contrast, Late/exhausted B-cells decreased significantly in both groups −5.4±1.03%, $p<0.0001$, auto: −5.9±2.5%, p=0.003; between group difference, p=0.57; Table 1). Early T-cell activation (alto: −5.57±1.03%, $p<0.0001$, auto: −2.92±1.5%, =0.02; between group, p=0.08; Table 1) decreased to similar degrees in both group. Whereas late/chronic T-cell activation did not significantly decrease in either group (allo: −2.3±1.3%, p=0.4, and auto: −3.4±2.7%, p=0.7).

Example 2

Treatment of Symptoms of Aging Frality—Study 1

Thirty subjects aged 60 years of age or older who met the study inclusion/exclusion criteria for frailty by the Canadian Study of Health and Aging (CSHA) were randomized. Ten subjects received 100 million MSCs, ten subjects received 200 million MSCs, and ten subjects received placebo. Subjects were followed for one year for safety and efficacy. Assessments included at least the following: a study of inflammatory biomarkers and a review of immunologic effects. FIG. 1. is a Consort Diagram. FIG. 2 provides baseline patient characteristics. FIGS. 3-7 illustrate the impact of allogeneic human MSCs on immune biomarkers.

Figure 3:
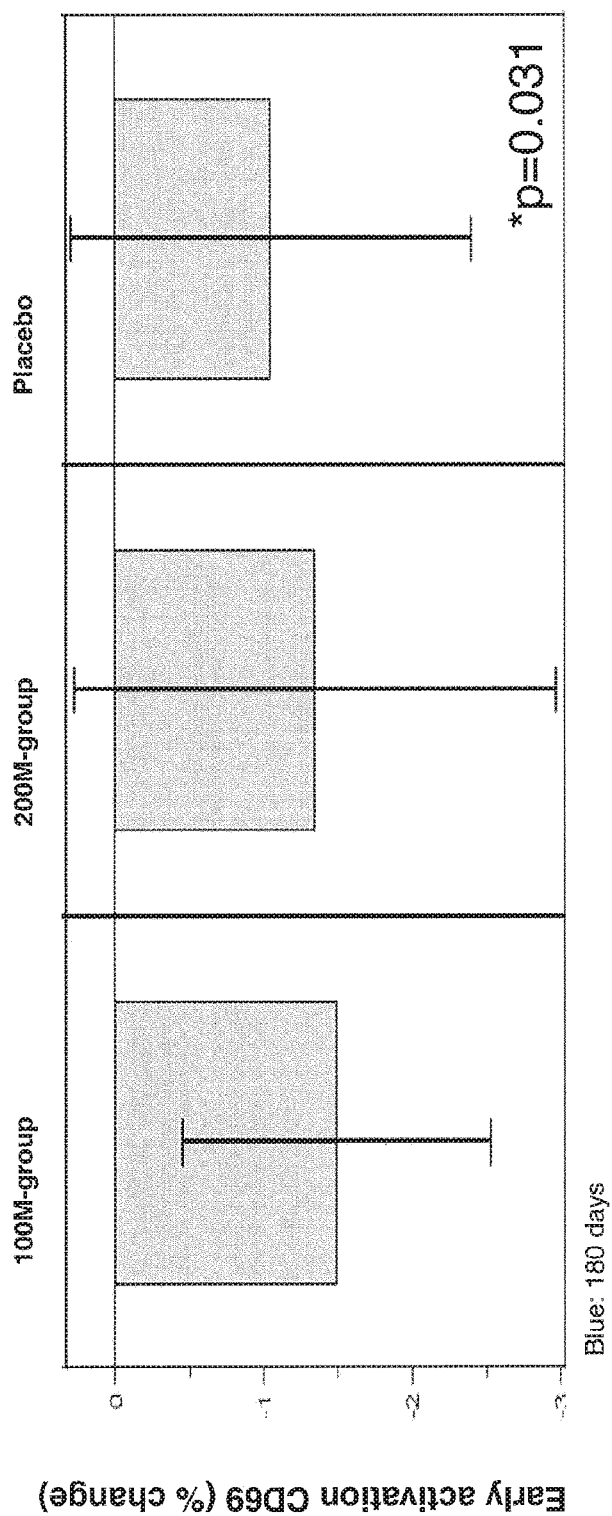
FIG. 3 shows a decrease in TNF-α in older subjects administered allogeneic human mesenchymal stem cells.
Figure 4:
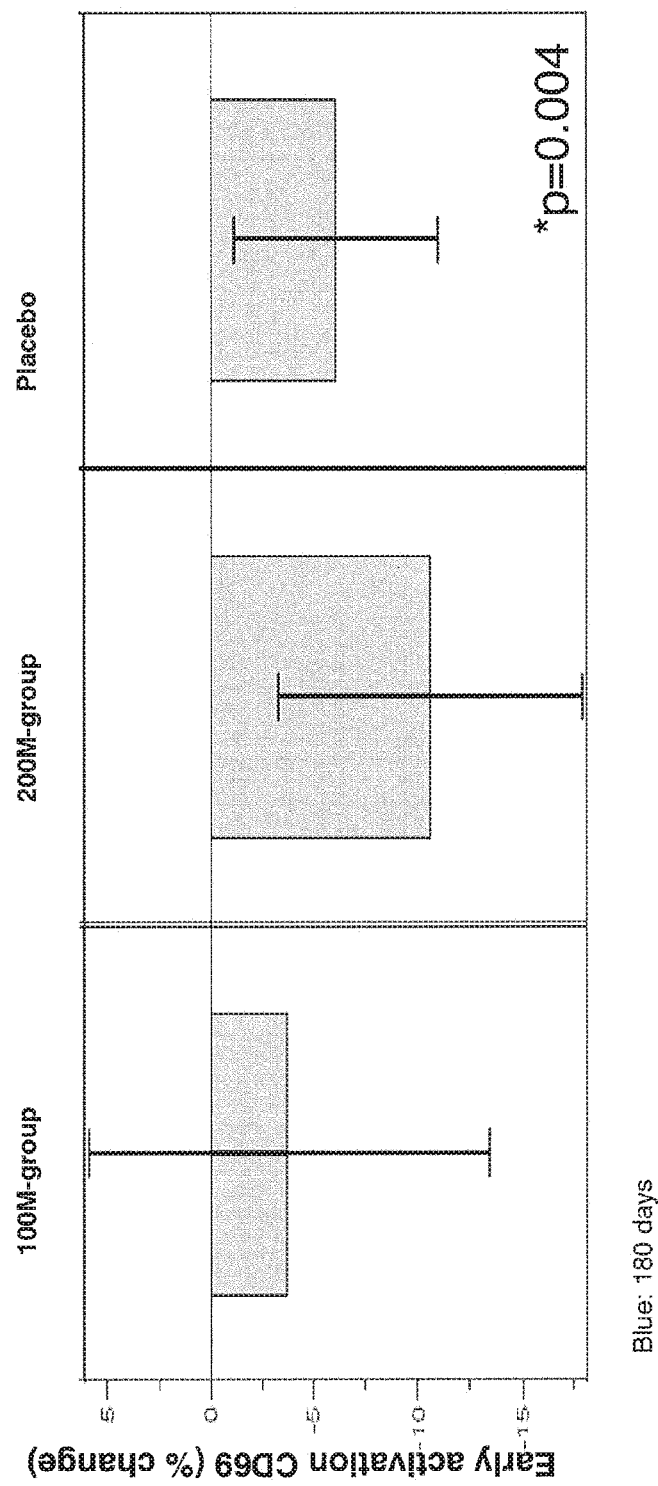
FIG. 4 shows a decrease in early activated cells expressing CD69 in older subjects administered allogeneic human mesenchymal stem cells.
Figure 5:
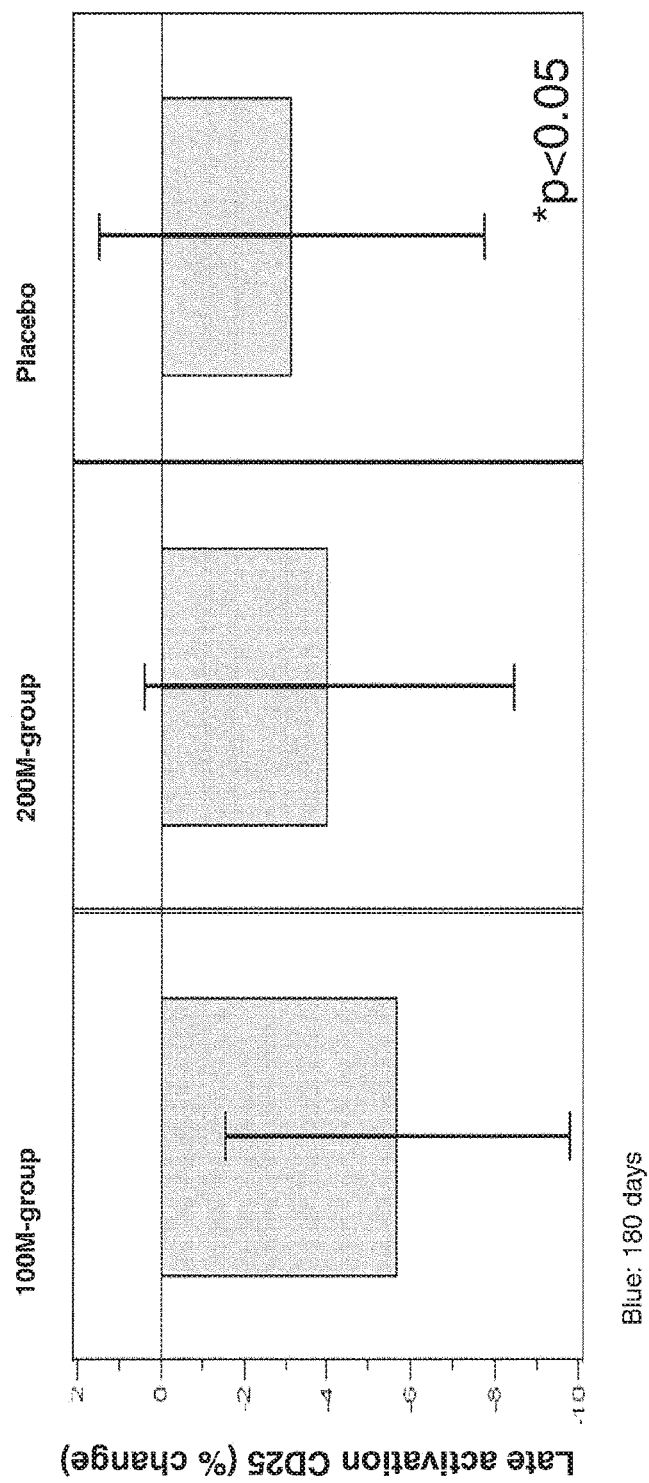
FIG. 5 shows a decrease in the numbers of chronic/late activated T cells expressing CD25 in older subjects administered allogeneic human mesenchymal stem cells.
Figure 6:
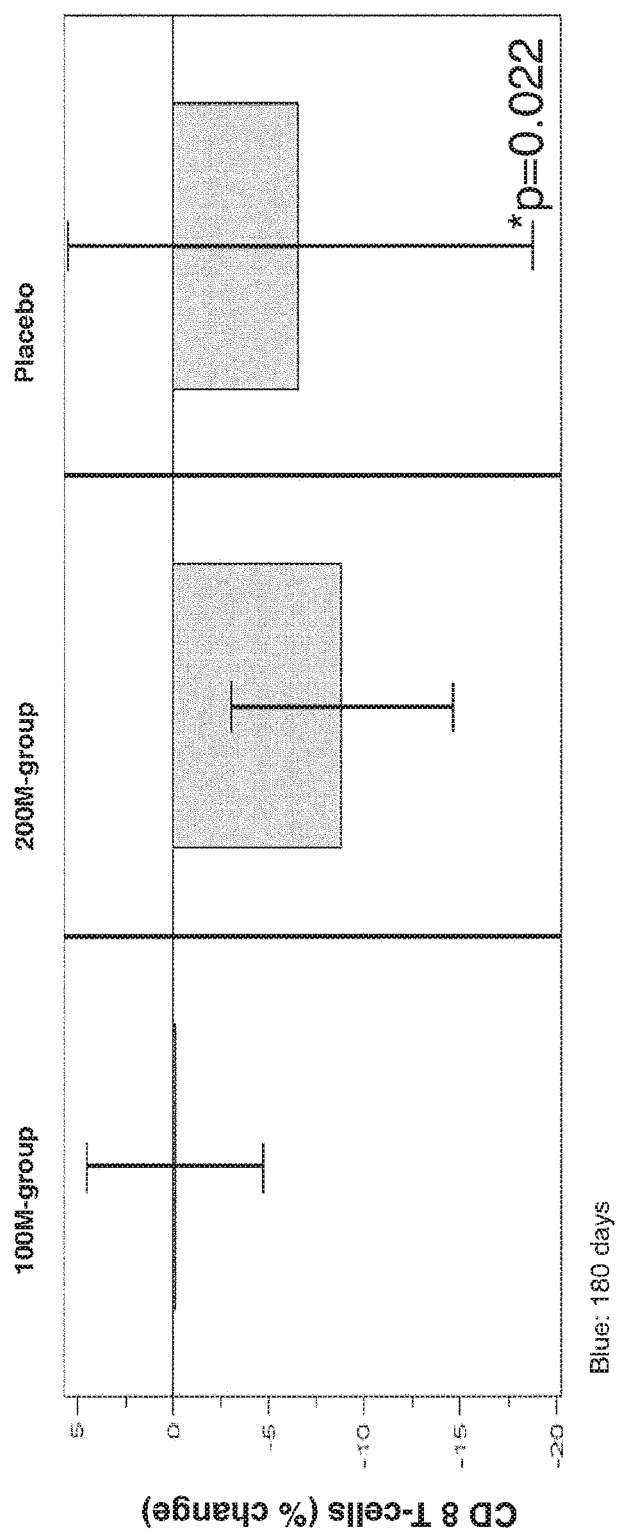
FIG. 6 shows measurements of CD8+ T cells in older subjects administered allogeneic human mesenchymal stem cells.
Figure 7:
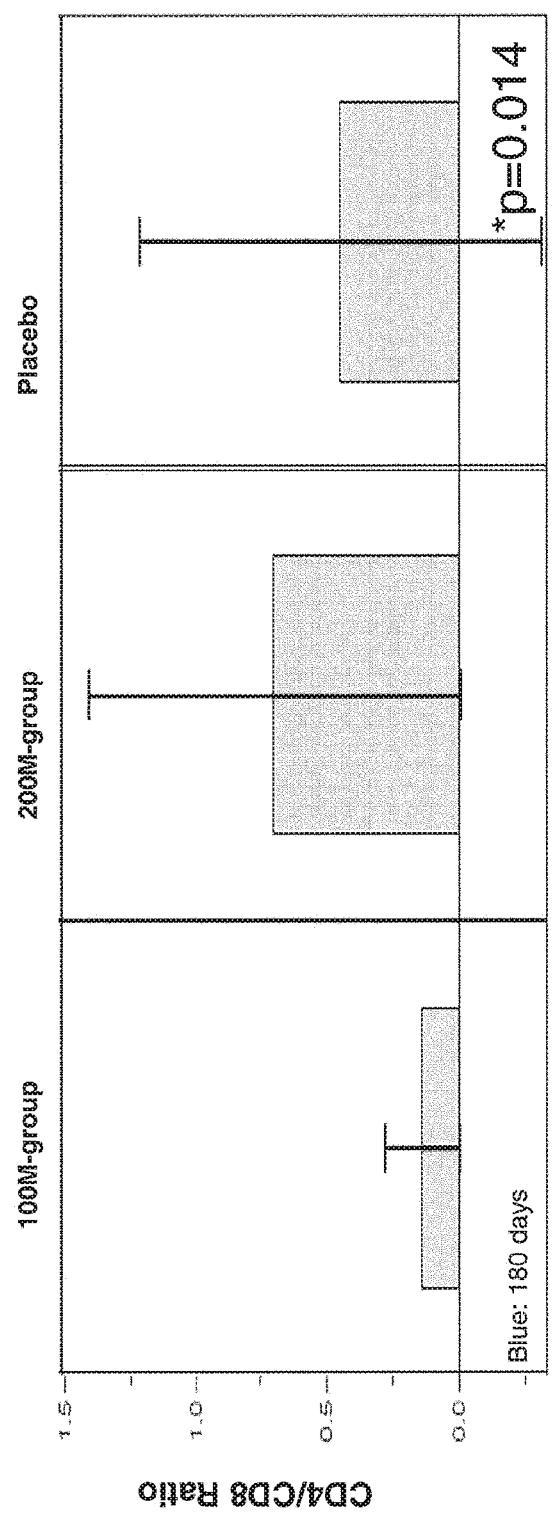
FIG. 7 shows an increase in the ratio of $CD4^+/CD8^+$ T cells in older subjects administered allogeneic human mesenchymal stem cells.

FIG. 3 shows a decrease TNF-α in subjects administered human MSCs. Both early and late/chronic T cell activation decreases after allogeneic MSC treatment. FIG. 4 shows a decrease in early activated T cells expressing CD69 in subjects administered human MSCs. FIG. 5 shows a decrease in the numbers of chronic/late activated T cells expressing CD25 in subjects administered human MSCs. FIG. 7 shows an increase in the ratio of $CD4^+/CD8^+$ T cells in subjects administered human MSCs.

Example 3

Treatment of Symptoms of Aging Frailty Study 2

Fifteen aged subjects were included in an open-label study and administered human mesenchymal stem cells in two separate infusions. Subjects were evaluated for changes in various immune biomarkers to determine a response to the injected human mesenchymal stem cells. These immune biomarkers included the levels of exhausted B cells ($CD19^+$,

TABLE 1

Effects of Human Mesenchymal Stem Cells on Cellular and Humoral Immunity at 6-months.

| Immune Biomarkers | Allogeneic | | Autologous | |
|---|---|---|---|---|
| | Baseline | 6-Months | Baseline | 6-Months |
| Serum TNF-α (pg/ml) | 13.5 ± 1.5 | 2.3 ± 0.2**,† | 11.8 ± 0.9 | 4.8 ± 0.8** |
| % Early T-cell Activation ($CD3^+$, $CD69^+$) | 13.4 ± 4.4 | 7.9 ± 3.3** | 13.3 ± 4.8 | 10.6 ± 5.4* |
| % Late/Chronic T-cell activation ($CD3^+$, $CD25^+$) | 8.9, IQR (5.9, 10.4) | 3.4, IQR (3.0, 5.0)* | 8.1, IQR (5.2, 14.1) | 4.4, IQR (3.6, 11.1) |
| % Temra ($CD3^+$, $CD45RA^+$, $CCR7^-$) | 33.7 ± 7.6 | 17.9 ± 5.2**,† | 30.1 ± 10.8 | 21.3 ± 7.5** |
| % Late/Exhausted B-cells ($CD19^+$, $CD27^-$, $IgD^-$) | 19.3, IQR (17.9, 28.6) | 14.7, IQR (14.2, 17.3)**,† | 20.0, IQR (17.7, 32.0) | 15.5, IQR (14.0, 19.0)* |
| % Switched Memory B-cells ($CD19^+$, $CD27^{high}$, $IgD^-$) | 10.0 ± 3.6 | 20.2 ± 3.1**,†† | 9.6 ± 3.1 | 14.1 ± 4.5* |
| % B-cells expressing intracellular TNF-α | 32.1 ± 7.3 | 20.4 ± 6.3** | 28.2 ± 6.8 | 19.7 ± 4.8** |

*indicates p ≤ 0.05 within group;
**indicates p ≤ 0.001 within group;
†indicates between group p ≤ 0.5;
††indicates between group p ≤ 0.001.

Figure 8:
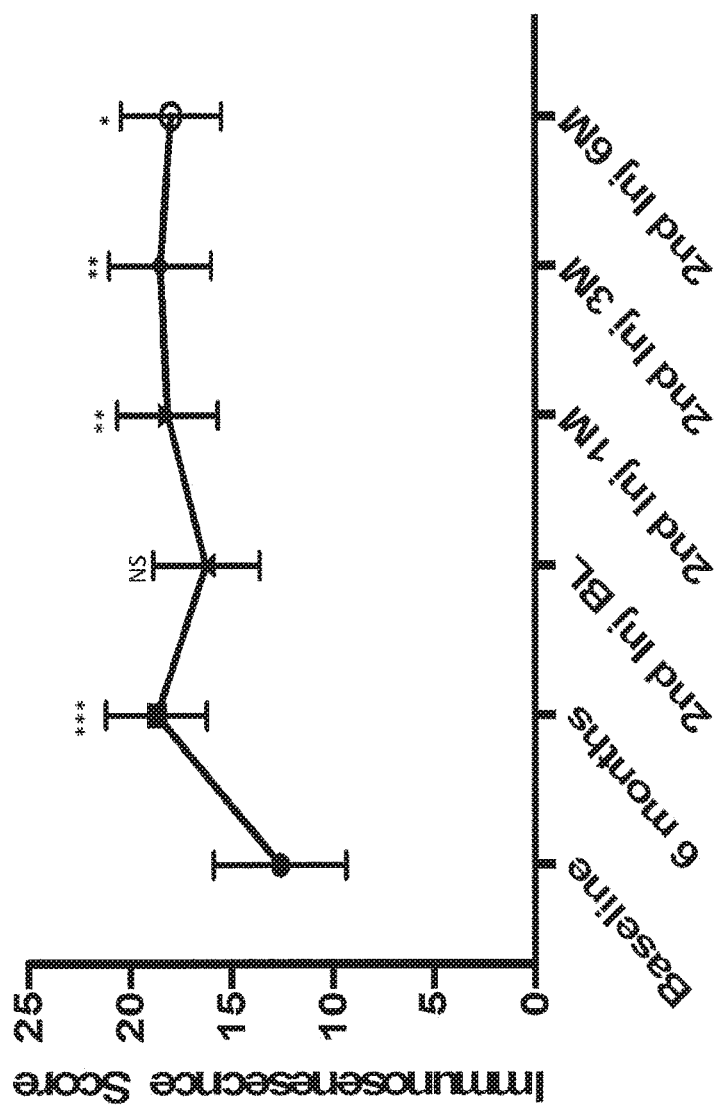
FIG. 8 shows an increased immunosenescence score in patients with aging frailty who received two infusions of human mesenchymal stem cells.
Figure 9:
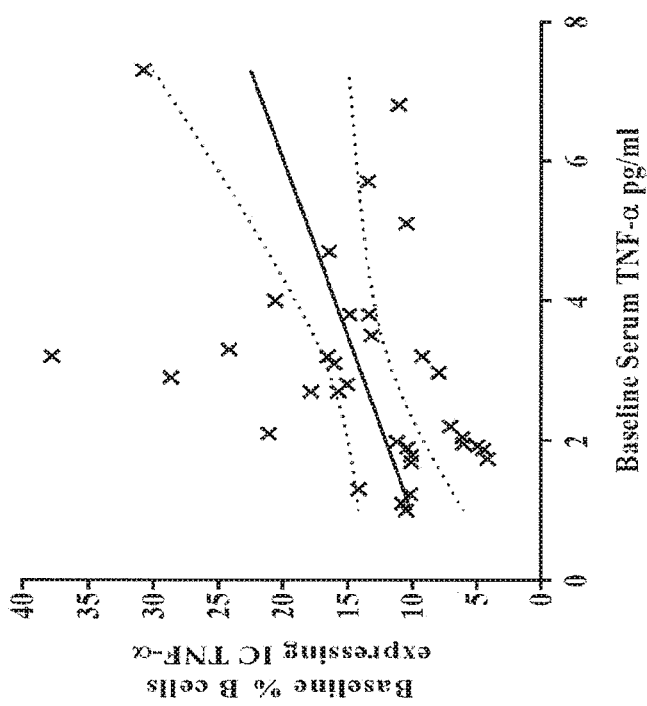
FIG. 9 shows a correlation between baseline serum TNF-α and baseline B cells expressing IC TNF-α.
Figure 10:
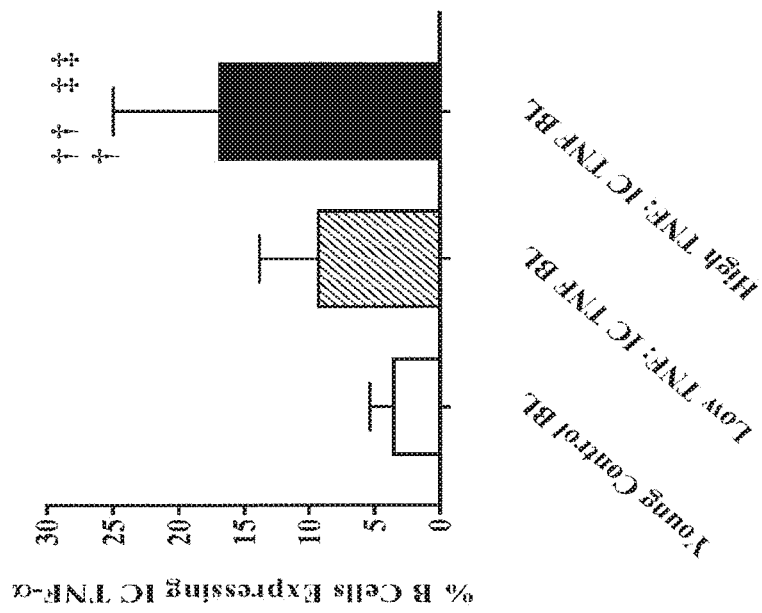
FIG. 10 provides the % of B cells expressing IC TNF-α in Young Control BL, Low TNF:IC TNF BL, and High TNF:IC TNF BL.
Figure 11:
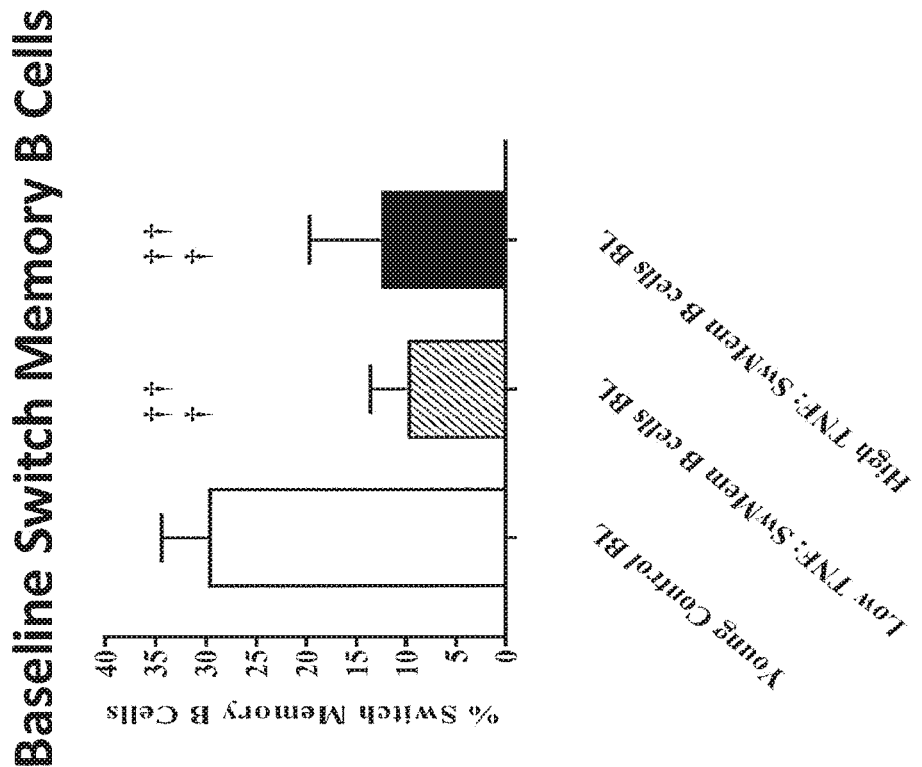
FIG. 11 provides the % of Switch Memory B cells in Young Control BL, Low TNF:SwMem B cells BL, and High TNF:SwMem B cells BL.
Figure 12:
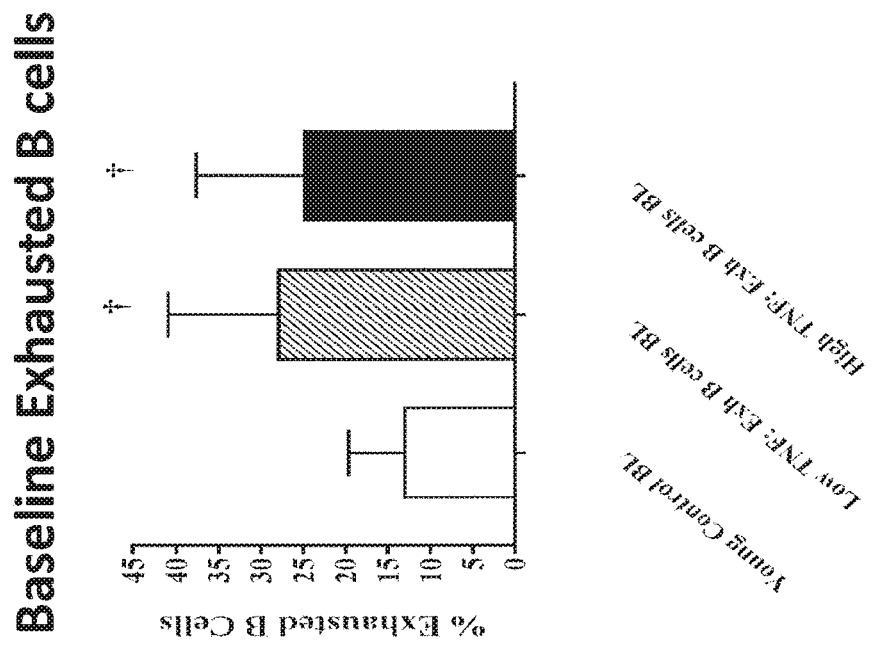
FIG. 12 provides the % of Exhausted B cells in Young Control BL, Low TNF:EXh B cells BL, and High TNF:EXh B cells BL.
Figure 13:
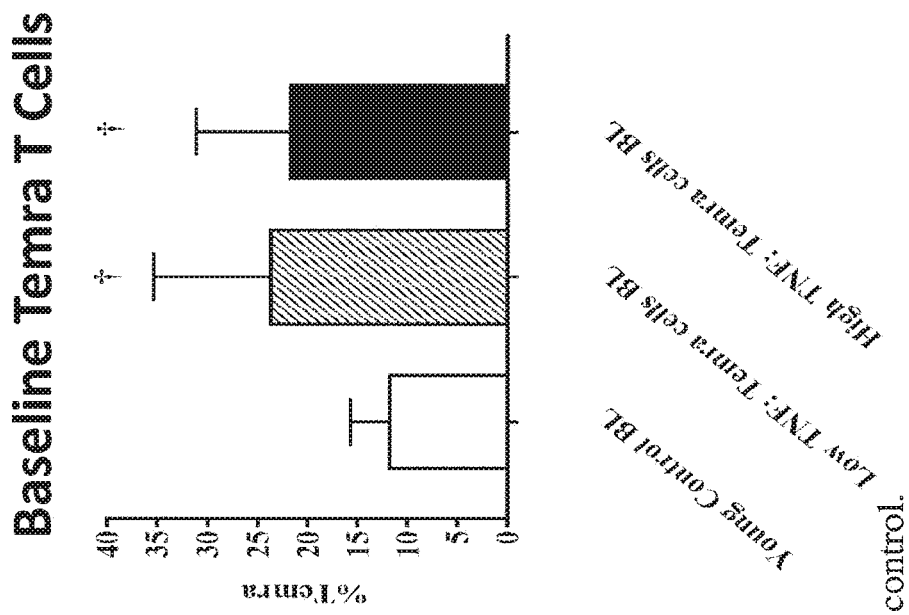
FIG. 13 provides the % of Temra cells in Young Control BL, Low TNF:Temra cells BL, and High TNF:Temra cells BL.
Figure 14:
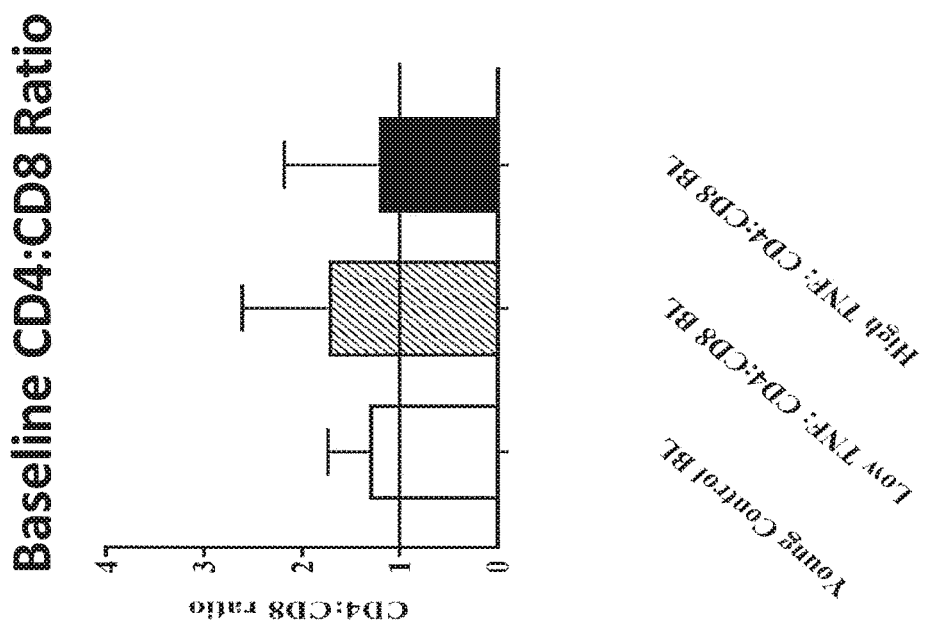
FIG. 14 provides the $CD4^+/CD8^+$ T cell ratio in Young Control BL, Low TNF:CD4:CD8 BL, and High TNF:CD4:CD8 BL, FIG. 15 provides the absolute change of serum TNF-α in pg/ml in Placebo Control, Low TNF-α, and High TNF-α.
Figure 15:
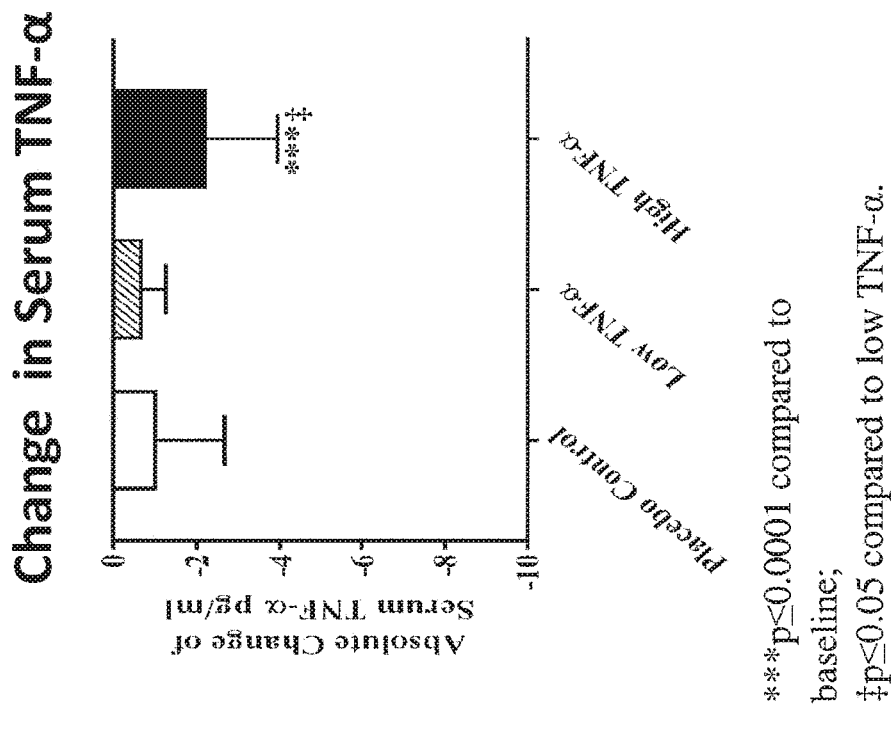
Figure 16:
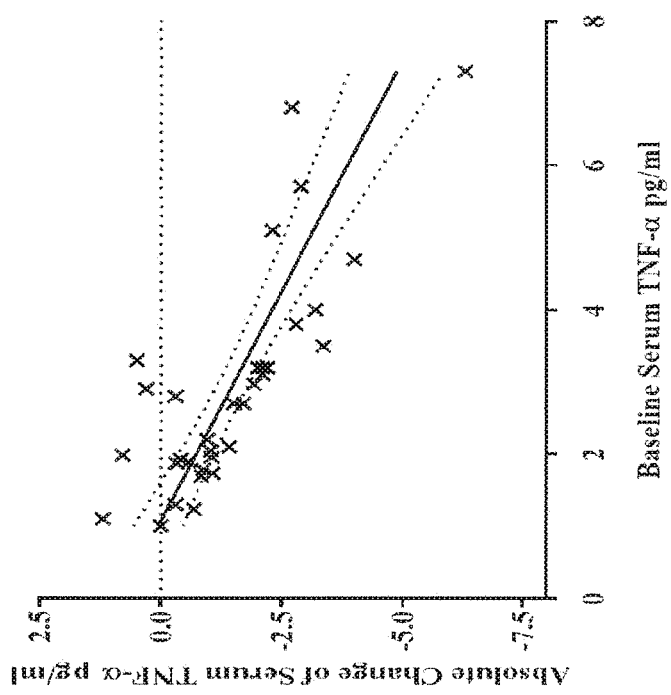
FIG. 16 shows a correlation between baseline serum TNF-α and the change in serum TNF-α.
Figure 17:
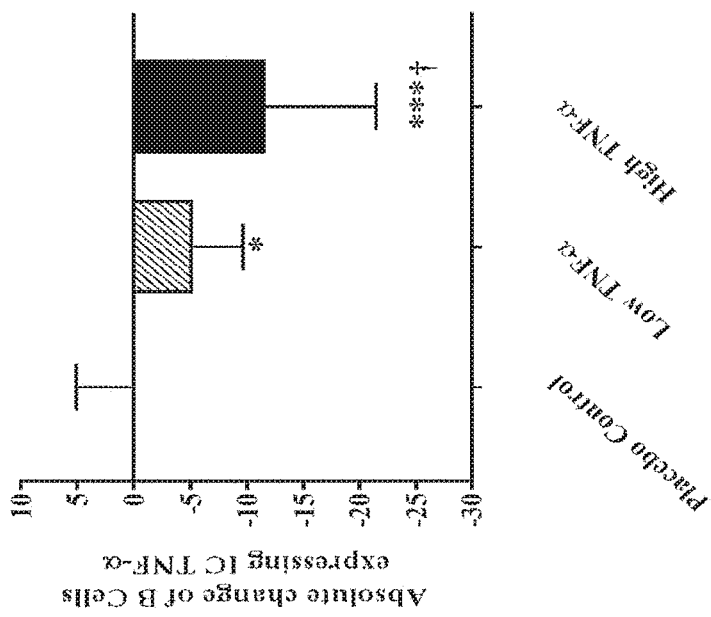
FIG. 17 shows the absolute change of B cells expressing IC TNF-α in Placebo Control, Low TNF-α, and High TNF-α.
Figure 18:
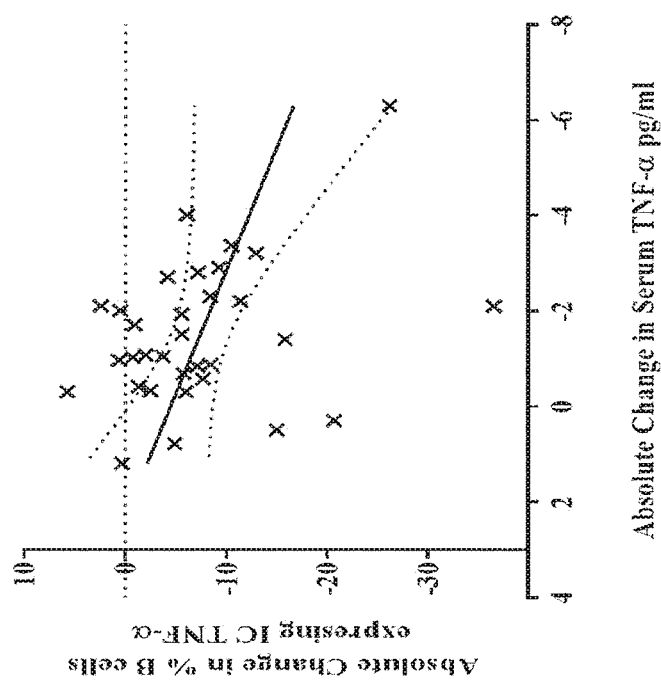
FIG. 18 shows a correlation between serum TNF-α and change in B cells expressing IC TNF-α.
Figure 19:
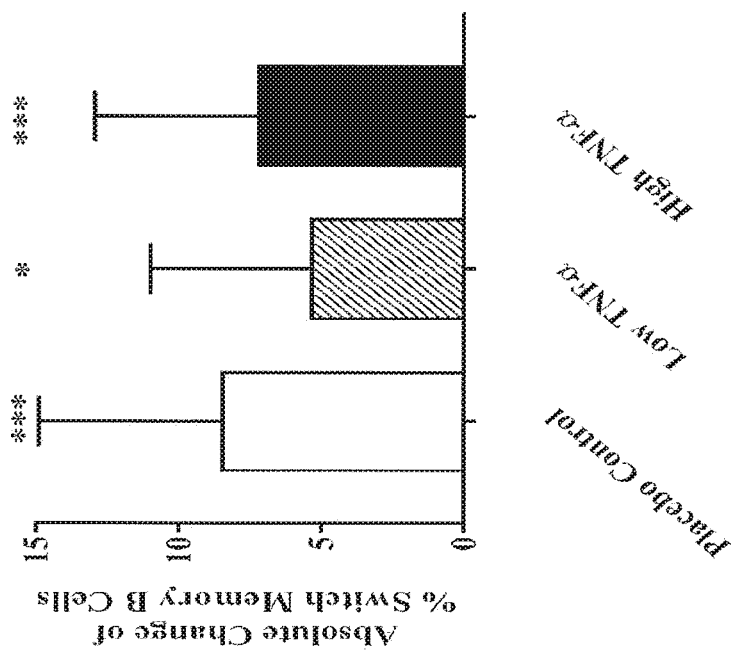
FIG. 19 shows the absolute change of % of Switch Memory B cells in Placebo Control, Low TNF-α, and High TNF-α.
Figure 20:
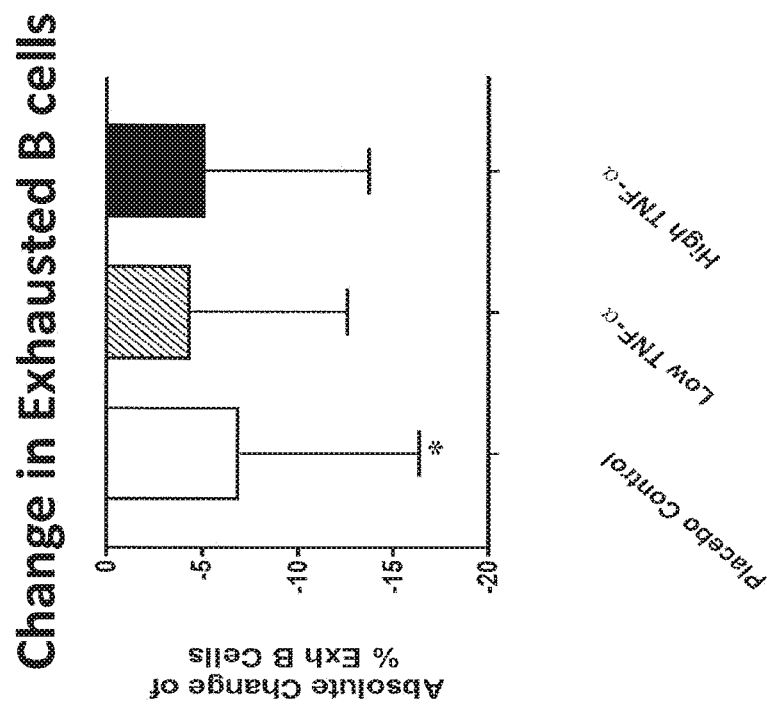
FIG. 20 shows the absolute change of % of Exhausted B cells in Placebo Control, Low TNF-α, and High TNF-α.
Figure 21:
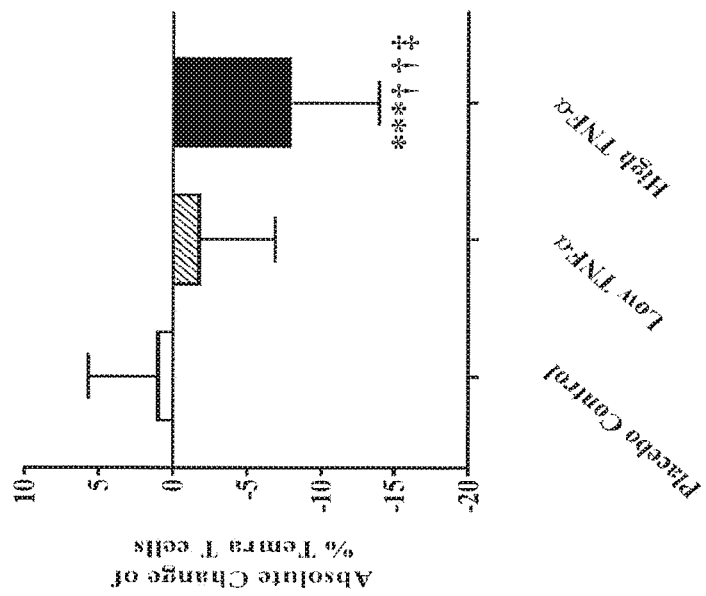
FIG. 21 shows the absolute change of % of Temra T cells in Placebo Control, Low TNF-α, and High TNF-α.
Figure 22:
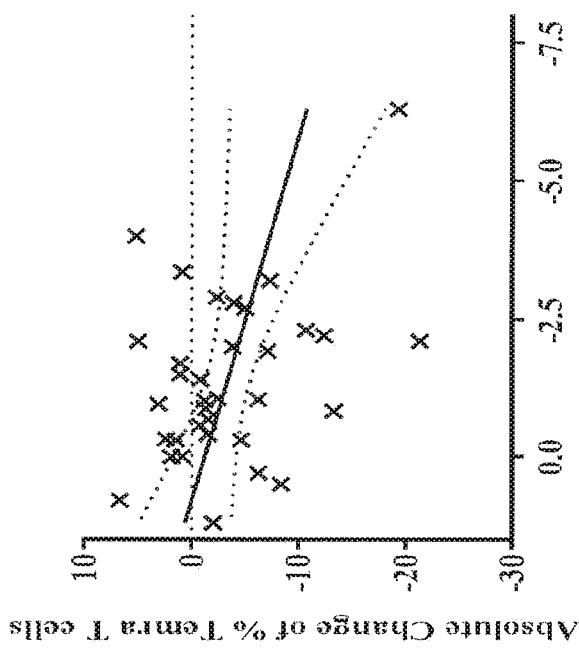
FIG. 22 shows a correlation between the change in serum TNF-α and the change in Temra cells.
Figure 23:
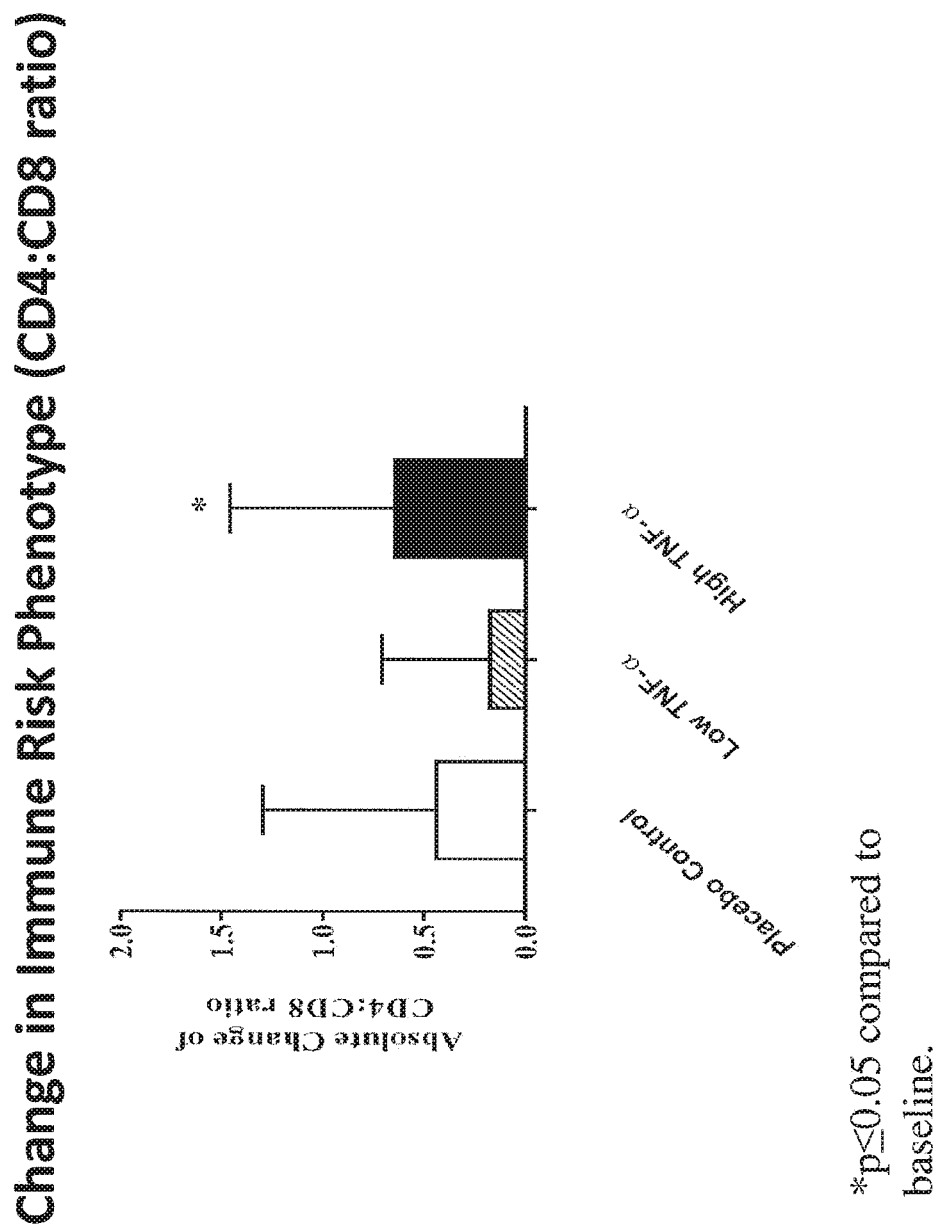
FIG. 23 shows the absolute change in the $CD4^+/CD8^+$ T cell ratio in Placebo Control, Low TNF-α, and High TNF-α.
Figure 24:
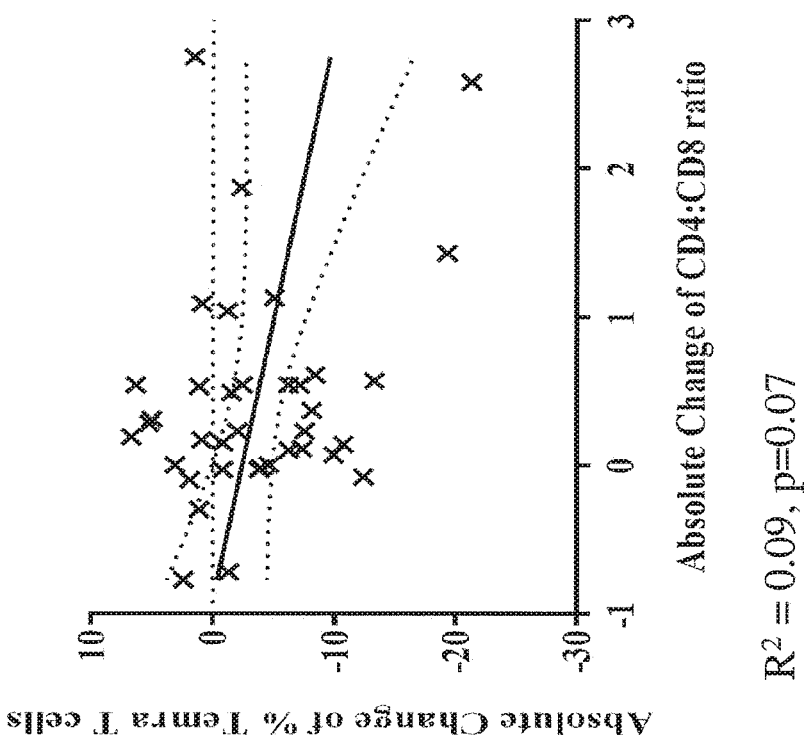
FIG. 24 shows a correlation between the change in $CD4^+/CD8^+$ cell ratio and the change in Temra T cells.

CD27⁻, IgD⁻), the levels of switched memory B cells (CD19⁺, CD27$^{high}$, IgD⁻), the levels of B-cells expressing intracellular TNF-α, the levels of early activated T-cells (CD3$^{30}$, CD69⁺), the levels of chronic activated T-cells (CD3⁺, CD25⁺), the levels of Temra cells (CD45RA⁺, CCR7⁻), the CD4⁺:CD8⁺ T cell ratio, and the TNF-α concentration in serum. Subjects were evaluated 6 months after the first injection and 1, 3, and 6 months after the second injection. Provided in Tables 2-9 are the measured values for each of the immune biomarkers discussed above. Also provided in Tables 2-9 are Scores assigned to each of the immune biomarkers assessed in each patient at different time-points that indicate whether an increase or decrease was observed in the immune biomarker measured. Finally, in Table 10 are the total Scores for each patient that includes different time-points as well as averages among the patients. As can be observed in the last row of Table 10 and in FIG. 8, the immunosenescence Score improves in subjects with aging frailty after the first injection of human mesenchymal stem cells and continues to stay in an improved state after a second injection of human mesenchymal stein cells.

TABLE 2

Effects of Human Mesenchymal Stem Cells on Switched Memory B Cells

| Patient # | BL | 6-Mo. | 2$^{nd}$ Inject. BL | 2$^{nd}$ Inject. 1-Mo. | 2$^{nd}$ Inject. 3-Mo. | 2$^{nd}$ Inject. 6-Mo. | BL Score | 6-Mo. Score | 2$^{nd}$ Inject. BL Score | 2$^{nd}$ Inject. 1-Mo. Score | 2$^{nd}$ Inject. 3-Mo. Score | 2$^{nd}$ Inject. 6-Mo. Score |
|---|---|---|---|---|---|---|---|---|---|---|---|---|
| 1 | 6.61 | 21.2 | 14.2 | 16.5 | 22.8 | 21.3 | 1 | 2 | 2 | 2 | 2 | 2 |
| 2 | 21.3 | 41 | 24.9 | 24 | 25.4 | 30.8 | 2 | 4 | 3 | 3 | 3 | 3 |
| 3 | 5.34 | 9.31 | 7.14 | 16.6 | 7.58 | 9.81 | 1 | 1 | 1 | 2 | 1 | 1 |
| 4 | 10.5 | 17 | 30.1 | 36.6 | 18.7 | 40.3 | 1 | 2 | 3 | 4 | 2 | 2 |
| 5 | 10.7 | 24 | 25. | 33.3 | 28.8 | 31.5 | 1 | 3 | 3 | 3 | 3 | 3 |
| 6 | 7.51 | 14.6 | 1.7 | 14.7 | 19.7 | 19.8 | 1 | 2 | 2 | 2 | 2 | 2 |
| 7 | 7.32 | 20.7 | 12.3 | 13.7 | 21.2 | 27.1 | 1 | 2 | 2 | 2 | 2 | 2 |
| 8 | 7.69 | 9.89 | 8.31 | 11.7 | 26.4 | 21.5 | 1 | 1 | 1 | 2 | 2 | 2 |
| 9 | 10.1 | 17.8 | 15.8 | 15.3 | 25.8 | 35.9 | 1 | 2 | 2 | 2 | 3 | 2 |
| 10 | 21.7 | 35.3 | 23.1 | 23.6 | 23.8 | 25.7 | 2 | 4 | 2 | 3 | 3 | 3 |
| 15 | 9.25 | 13.5 | 22.3 | 28.1 | 28.1 | 29.7 | 1 | 2 | 2 | 3 | 3 | 3 |

Improvement Scale: No Change = 0; Improved >0 ≤ 1 fold = 1; Improved >1 ≤ 2 fold = 2; Improved >2 ≤ 3 fold = 3; Improved >3 fold = 4; Worsened >0 ≤ 1 fold = −1; Worsened >1 ≤ 2 fold = −2; Worsened >2 ≤ 3 fold = −3; and Worsened >3 fold = −4.

TABLE 3

Effects of Human Mesenchymal Stem Cells on % B-Cells Expressing Intracellular TNF-α

| Patient # | BL | 6-Mo. | 2$^{nd}$ Inject. BL | 2$^{nd}$ Inject. 1-Mo. | 2$^{nd}$ Inject. 3-Mo. | 2$^{nd}$ Inject. 6-Mo. | BL Score | 6-Mo. Score | 2$^{nd}$ Inject. BL Score | 2$^{nd}$ Inject. 1-Mo. Score | 2$^{nd}$ Inject. 3-Mo. Score | 2$^{nd}$ Inject. 6-Mo. Score |
|---|---|---|---|---|---|---|---|---|---|---|---|---|
| 1 | 23.4 | 9.65 | 15.6 | 9.59 | 5.35 | 8.21 | 1 | 3 | 2 | 2 | 4 | 3 |
| 2 | 34.8 | 9.33 | 10 | 9.83 | 6.88 | 6.71 | 1 | 3 | 2 | 3 | 3 | 3 |
| 3 | 14.3 | 7.62 | 40.4 | 21.2 | 15.7 | 8.02 | 2 | 3 | 1 | 2 | 3 | 3 |
| 4 | 14.3 | 7.63 | 13.7 | 12 | 5.25 | 3.63 | 2 | 2 | 2 | 2 | 4 | 4 |
| 5 | 19.5 | 10.9 | 9.52 | 8.89 | 8.33 | 7.59 | 2 | 2 | 2 | 3 | 3 | 3 |
| 6 | 37.7 | 1.22 | 5.57 | 4 | 4.04 | 4.33 | 1 | 4 | 4 | 4 | 4 | 4 |
| 7 | 13.2 | 2.71 | 4.1 | 3.67 | 4.42 | 2.52 | 2 | 4 | 4 | 4 | 4 | 4 |
| 8 | 30.8 | 4.66 | 6.82 | 7.01 | 7.05 | 7.42 | 1 | 4 | 3 | 3 | 3 | 3 |
| 9 | 11.1 | 6.94 | 11.2 | 5.76 | 7.79 | 5.1 | 2 | 3 | 2 | 4 | 3 | 4 |
| 10 | 13.5 | 4.2 | 3.55 | 3.87 | 3.72 | 3.42 | 2 | 4 | 4 | 4 | 4 | 4 |
| 15 | 7.05 | 4.75 | 5.75 | 3.84 | 6.46 | 2.04 | 3 | 4 | 4 | 4 | 4 | 4 |

TABLE 4

Effects of Human Mesenchymal Stem Cells on Exhausted B Cells

| Patient # | BL | 6-Mo. | 2$^{nd}$ Inject. BL | 2$^{nd}$ Inject. 1-Mo. | 2$^{nd}$ Inject. 3-Mo. | 2$^{nd}$ Inject. 6-Mo. | BL Score | 6-Mo. Score | 2$^{nd}$ Inject. BL Score | 2$^{nd}$ Inject. 1-Mo. Score | 2$^{nd}$ Inject. 3-Mo. Score | 2$^{nd}$ Inject. 6-Mo. Score |
|---|---|---|---|---|---|---|---|---|---|---|---|---|
| 1 | 23.2 | 40.4 | 15.7 | 9.88 | 10.7 | 15.6 | 1 | 1 | 2 | 3 | 3 | 2 |
| 2 | 26.8 | 27.6 | 6.59 | 3.33 | 6.67 | 7.51 | 1 | 1 | 4 | 4 | 4 | 4 |
| 3 | 7.63 | 18.2 | 15.7 | 15.7 | 9.01 | 14.2 | 4 | 2 | 2 | 2 | 3 | 2 |
| 4 | 29.1 | 14.8 | 11.9 | 7.12 | 9.86 | 10.1 | 1 | 2 | 3 | 4 | 3 | 3 |
| 5 | 53.3 | 15.2 | 19.2 | 8.39 | 13.6 | 12.9 | 1 | 2 | 2 | 4 | 2 | 3 |
| 6 | 34.6 | 14.1 | 9.47 | 9.09 | 8.01 | 5.26 | 1 | 2 | 3 | 3 | 4 | 4 |
| 7 | 44.1 | 51.9 | 66.5 | 57.2 | 43.1 | 40.3 | 1 | 1 | 1 | 1 | 1 | 1 |
| 8 | 9.23 | 7.1 | 12.6 | 11.6 | 8.05 | 12 | 3 | 4 | 3 | 3 | 4 | 3 |

TABLE 4-continued

Effects of Human Mesenchymal Stem Cells on Exhausted B Cells

| Patient # | BL | 6-Mo. | 2nd Inject. BL | 2nd Inject. 1-Mo. | 2nd Inject. 3-Mo. | 2nd Inject. 6-Mo. | BL Score | 6-Mo. Score | 2nd Inject. BL Score | 2nd Inject. 1-Mo. Score | 2nd Inject. 3-Mo. Score | 2nd Inject. 6-Mo. Score |
|---|---|---|---|---|---|---|---|---|---|---|---|---|
| 9 | 15.4 | 17.8 | 15.6 | 7.85 | 9.51 | 17.8 | 2 | 2 | 2 | 4 | 3 | 2 |
| 10 | 12.5 | 24.6 | 7.17 | 11.9 | 13.4 | 7.42 | 2 | 2 | 4 | 3 | 2 | 4 |
| 15 | 32.4 | 26.6 | 24.4 | 16.2 | 11.7 | 12.4 | 1 | 1 | 2 | 2 | 3 | 3 |

TABLE 5

Effects of Human Mesenchymal Stem Cells on Temra Cells

| Patient # | BL | 6-Mo. | 2nd Inject. BL | 2nd Inject. 1-Mo. | 2nd Inject. 3-Mo. | 2nd Inject. 6-Mo. | BL Score | 6-Mo. Score | 2nd Inject. BL Score | 2nd Inject. 1-Mo. Score | 2nd Inject. 3-Mo. Score | 2nd Inject. 6-Mo. Score |
|---|---|---|---|---|---|---|---|---|---|---|---|---|
| 1 | 30.1 | 42.6 | 14.6 | 17.4 | 19.4 | 15.4 | 1 | 1 | 2 | 2 | 1 | 2 |
| 2 | 25.6 | 27.8 | 25.2 | 27 | 26.4 | 37.1 | 1 | 1 | 1 | 1 | 1 | 1 |
| 3 | 7.55 | 2.85 | 14.4 | 13.3 | 10.1 | 11.8 | 3 | 4 | 2 | 2 | 2 | 2 |
| 4 | 15.7 | 3.06 | 15 | 12.7 | 9.5 | 12.5 | 2 | 4 | 2 | 2 | 3 | 2 |
| 5 | 10 | 2.85 | 9.86 | 8.43 | 11 | 10.4 | 2 | 4 | 2 | 3 | 2 | 2 |
| 6 | 39.5 | 18.2 | 21.6 | 16.4 | 20 | 18.1 | 1 | 2 | 1 | 2 | 1 | 2 |
| 7 | 13.3 | 14.2 | 11.4 | 10.3 | 15 | 17.7 | 2 | 2 | 2 | 2 | 2 | 2 |
| 8 | 31.5 | 12.2 | 11.8 | 7.09 | 11.6 | 33.3 | 1 | 2 | 2 | 3 | 2 | 1 |
| 9 | 16.1 | 11.1 | 24 | 25.1 | 34.3 | 38.8 | 2 | 2 | 1 | 1 | 1 | 1 |
| 10 | 7.15 | 4.89 | 12.2 | 19 | 9.52 | 13.2 | 3 | 4 | 2 | 2 | 3 | 2 |
| 15 | 15.2 | 13.3 | 30.2 | 40.6 | 46.1 | 34.9 | 2 | 2 | 1 | 1 | 1 | 1 |

TABLE 6

Effects of Human Mesenchymal Stem Cells on Early Activation of T Cells (CD69)

| Patient # | BL | 6-Mo. | 2nd Inject. BL | 2nd Inject. 1-Mo. | 2nd Inject. 3-Mo. | 2nd Inject. 6-Mo. | BL Score | 6-Mo. Score | 2nd Inject. BL Score | 2nd Inject. 1-Mo. Score | 2nd Inject. 3-Mo. Score | 2nd Inject. 6-Mo. Score |
|---|---|---|---|---|---|---|---|---|---|---|---|---|
| 1 | 16 | 16.6 | 12.98 | 8.03 | 8.74 | 6.07 | 2 | 2 | 2 | 3 | 3 | 4 |
| 2 | 5.8 | 7.5 | 10.31 | 13.82 | 10.77 | 12.21 | 4 | 4 | 3 | 2 | 3 | 2 |
| 3 | 29 | 13 | 14.76 | 3.36 | 4.83 | 9.14 | 1 | 2 | 2 | 4 | 4 | 3 |
| 4 | 65 | 30 | 7.87 | 5 | 4.33 | 17.07 | 1 | 1 | 3 | 4 | 4 | 2 |
| 5 | 4.4 | 11.7 | 13.15 | 3.42 | 20.88 | 6.75 | 4 | 2 | 2 | 4 | 2 | 4 |
| 6 | 42 | 22.4 | 13.23 | 13.56 | 8.6 | 13.29 | 1 | 2 | 2 | 2 | 3 | 2 |
| 7 | 25.8 | 22.1 | 13.73 | 10.26 | 10.87 | 37.35 | 1 | 2 | 2 | 3 | 3 | 1 |
| 8 | 28.3 | 17.1 | 4.22 | 5.1 | 4.93 | 12.32 | 1 | 2 | 4 | 4 | 4 | 2 |
| 9 | 4.4 | 6.2 | 20.12 | 7.63 | 12.06 | 11.9 | 4 | 4 | 2 | 3 | 2 | 2 |
| 10 | 19.4 | 17.9 | 14.18 | 13.53 | 6.22 | 13.85 | 2 | 2 | 2 | 2 | 4 | 2 |
| 15 | 10.9 | 6.18 | 14.18 | 12.79 | 14.2 | 13.1 | 3 | 4 | 2 | 2 | 2 | 2 |

TABLE 7

Effects of Human Mesenchymal Stem Cells on Late/Chronic Activation of T Cells (CD25)

| Patient # | BL | 6-Mo. | 2nd Inject. BL | 2nd Inject. 1-Mo. | 2nd Inject. 3-Mo. | 2nd Inject. 6-Mo. | BL Score | 6-Mo. Score | 2nd Inject. BL Score | 2nd Inject. 1-Mo. Score | 2nd Inject. 3-Mo. Score | 2nd Inject. 6-Mo. Score |
|---|---|---|---|---|---|---|---|---|---|---|---|---|
| 1 | 1.7 | 2.9 | 5.74 | 8.32 | 10.98 | 7.63 | 4 | 4 | 3 | 2 | 2 | 2 |
| 2 | 2.2 | 3 | 4.25 | 4.69 | 3.84 | 4.7 | 4 | 4 | 3 | 3 | 4 | 3 |
| 3 | 20 | 5 | 10.83 | 4.93 | 14.32 | 5.87 | 1 | 3 | 2 | 3 | 1 | 3 |
| 4 | 53 | 3.2 | 4.54 | 5.88 | 7.44 | 6.97 | 1 | 4 | 3 | 3 | 2 | 2 |
| 5 | 10 | 1.9 | 5.69 | 7.9 | 7.91 | 8.9 | 2 | 4 | 3 | 2 | 2 | 2 |

TABLE 7-continued

Effects of Human Mesenchymal Stem Cells on Late/Chronic Activation of T Cells (CD25)

| Patient # | BL | 6-Mo. | 2$^{nd}$ Inject. BL | 2$^{nd}$ Inject. 1-Mo. | 2$^{nd}$ Inject. 3-Mo. | 2$^{nd}$ Inject. 6-Mo. | BL Score | 6-Mo. Score | 2$^{nd}$ Inject. BL Score | 2$^{nd}$ Inject. 1-Mo. Score | 2$^{nd}$ Inject. 3-Mo. Score | 2$^{nd}$ Inject. 6-Mo. Score |
|---|---|---|---|---|---|---|---|---|---|---|---|---|
| 6 | 16 | 1.4 | 5.69 | 6.95 | 6.69 | 2.53 | 1 | 4 | 3 | 2 | 2 | 4 |
| 7 | 0.9 | 2.3 | 7.35 | 8.38 | 6.77 | 8.19 | 4 | 4 | 2 | 2 | 2 | 2 |
| 8 | 20.5 | 3.7 | 6.81 | 9.41 | 10.74 | 4.26 | 1 | 4 | 2 | 2 | 2 | 3 |
| 9 | 2.1 | 1.3 | 3 | 4.47 | 3.88 | 3.82 | 4 | 4 | 4 | 3 | 4 | 4 |
| 10 | 6.6 | 2.9 | 11.61 | 5.29 | 3.88 | 5.08 | 2 | 4 | 2 | 3 | 4 | 3 |
| 15 | 1.4 | 1.11 | 11.61 | 2.21 | 3.14 | 2.11 | 4 | 4 | 2 | 4 | 4 | 4 |

TABLE 8

Effects of Human Mesenchymal Stem Cells on Ratio of CD4$^+$:CD8$^+$ T Cells

| Patient # | BL Ratio | 6-Mo. Ratio | 2$^{nd}$ Inject. BL Ratio | 2$^{nd}$ Inject. 1-Mo. Ratio | 2$^{nd}$ Inject. 3-Mo. Ratio | 2$^{nd}$ Inject. 6-Mo. Ratio | BL Score | 6-Mo. Score | 2$^{nd}$ Inject. BL Score | 2$^{nd}$ Inject. 1-Mo. Score | 2$^{nd}$ Inject. 3-Mo. Score | 2$^{nd}$ Inject. 6-Mo. Score |
|---|---|---|---|---|---|---|---|---|---|---|---|---|
| 1 | 0.77 | 0.69 | 0.48 | 1.03 | 0.68 | 0.66 | 1 | 1 | 1 | 1 | 1 | 1 |
| 2 | 2.17 | 2.48 | 0.98 | 1.16 | 1.48 | 0.96 | 2 | 2 | 1 | 1 | 2 | 1 |
| 3 | 1.66 | 1.94 | 2.24 | 1.95 | 2.98 | 2.32 | 2 | 2 | 2 | 2 | 3 | 2 |
| 4 | 0.96 | 3.43 | 6.49 | 2.18 | 3.67 | 4.59 | 1 | 3 | 4 | 2 | 3 | 4 |
| 5 | 2.34 | 5.32 | 5.05 | 4.27 | 4.45 | 3.79 | 2 | 4 | 4 | 4 | 4 | 3 |
| 6 | 0.94 | 3.47 | 4.38 | 3.54 | 3.50 | 4.42 | 1 | 3 | 4 | 2 | 3 | 4 |
| 7 | 0.51 | 1.60 | 0.95 | 0.92 | 0.92 | 0.97 | 1 | 2 | 1 | 1 | 1 | 1 |
| 8 | 0.83 | 2.26 | 2.49 | 2.49 | 2.58 | 0.21 | 1 | 2 | 2 | 2 | 2 | 1 |
| 9 | 1.57 | 2.68 | 1.56 | 2.48 | 1.25 | 0.67 | 2 | 2 | 2 | 2 | 1 | 1 |
| 10 | 3.02 | 4.76 | 3.97 | 3.26 | 4.66 | 2.65 | 3 | 4 | 3 | 3 | 4 | 2 |
| 15 | 0.68 | 1.94 | 0.84 | 0.62 | 0.47 | 1.10 | 1 | 2 | 1 | 1 | 1 | 1 |

TABLE 9

Effects of Human Mesenchymal Stem Cells on Serum TNF-α Concentration

| Patient # | BL | 6-Mo. | 6-Mo. Score |
|---|---|---|---|
| 1 | 3.5 | 2.4 | 2 |
| 2 | 3.6 | 2.2 | 2 |
| 3 | 2.8 | 2.3 | 2 |
| 4 | 2.8 | 0.9 | 2 |
| 5 | 8 | 6.8 | 0 |
| 6 | 3.2 | 1.1 | 2 |
| 7 | 3.5 | 0.14 | 2 |
| 8 | 7.3 | 0 | 2 |
| 9 | 6.8 | 4.1 | 2 |
| 10 | 5.7 | 2.8 | 2 |
| 11 | 6.3 | 2.7 | 2 |
| 12 | 4.1 | 2.2 | 2 |
| 13 | 3.5 | 0.6 | 2 |
| 14 | 9.2 | 3.8 | 2 |
| 15 | 6.3 | 1.2 | 2 |

TABLE 10

Total Immunosenescence Scores of Patients

| Patient # | BL | 6-Mo. | 2$^{nd}$ Inject. BL | 2$^{nd}$ Inject. 1-Mo. Score | 2$^{nd}$ Inject. 3-Mo. Score | 2$^{nd}$ Inject. 60-Mo. Score |
|---|---|---|---|---|---|---|
| 1 | 11 | 14 | 14 | 15 | 16 | 16 |
| 2 | 15 | 19 | 17 | 17 | 20 | 17 |
| 3 | 14 | 17 | 12 | 17 | 17 | 16 |
| 4 | 9 | 18 | 20 | 21 | 21 | 21 |
| 5 | 14 | 21 | 18 | 23 | 18 | 20 |
| 6 | 7 | 19 | 19 | 17 | 19 | 22 |
| 7 | 12 | 17 | 14 | 15 | 15 | 14 |
| 8 | 9 | 19 | 17 | 19 | 19 | 16 |
| 9 | 17 | 19 | 15 | 19 | 17 | 18 |
| 10 | 16 | 24 | 19 | 20 | 24 | 20 |
| 15 | 15 | 19 | 14 | 17 | 18 | 18 |
| Average | 12.64 | 18.73 | 16.27 | 18.18 | 18.55 | 18 |

What is claimed is:

1. A method of treating symptoms of aging frailty in a human subject, wherein the subject exhibits inflammaging; the method comprising:
    (a) administering a therapeutically effective amount of a population of isolated allogeneic human mesenchymal stem cells to a subject in need thereof; and
    (b) decreasing the number of exhausted B cells (CD19$^+$, CD27$^-$, IgD$^-$) in a sample of the subject's serum by at least 10% as compared to the number of exhausted B cells in a sample of the subject's serum prior to administration of said population of isolated allogeneic human mesenchymal stem cells, thereby treating said symptoms of aging frailty.

2. A method of treating symptoms of aging frailty in a human subject, wherein the subject exhibits inflammaging; the method comprising;

(a) administering a therapeutically effective amount of a population of isolated allogeneic human mesenchymal stem cells to a subject in need thereof; and (b) increasing the number of switched memory B cells (CD19$^+$, CD27$^{high}$, IgD$^-$) in a sample of the subject's serum by at least 75% as compared to the number of switched memory B cells in a sample of the subject's serum prior to administration of said population of isolated allogeneic human mesenchymal stem cells, thereby treating said symptoms of aging frailty.

3. A method of treating symptoms of aging frailty in a human subject, wherein the subject exhibits inflammaging; the method comprising:

(a) administering a therapeutically effective amount of a population of isolated allogeneic human mesenchymal stem cells to a subject in need thereof; and (b) decreasing the number of B-cells expressing intracellular TNF-α in a sample of the subject's serum by at least 60% as compared to the number of B-cells expressing intracellular TNF-α in a sample of the subject's serum prior to administration of said population of isolated allogeneic human mesenchymal stem cells, thereby treating said symptoms of aging frailty.

4. A method of treating symptoms of aging frailty in a human subject, wherein the subject exhibits inflammaging; the method comprising:

(a) administering a therapeutically effective amount of a population of isolated allogeneic human mesenchymal stem cells to a subject in need thereof; and (b) decreasing the number of early activated T-cells (CD3$^+$, CD69$^+$) in a sample of the subject's serum by at least 30% as compared to the number of early activated T-cells in a sample of the subject's serum prior to administration of said population of isolated allogeneic human mesenchymal stem cells, thereby treating said symptoms of aging frailty.

5. A method of treating symptoms of aging frailty in a human subject, wherein the subject exhibits inflammaging; the method comprising:

(a) administering a therapeutically effective amount of a population of isolated allogeneic human mesenchymal stem cells to a subject in need thereof; and (b) decreasing the number of chronic activated T-cells (CD3$^+$, CD25$^+$) in a sample of the subject's serum by at least 75% as compared to the number of chronic activated T-Cells in a sample of the subject's serum prior to administration of said population of isolated allogeneic human mesenchymal stem cells, thereby treating said symptoms of aging frailty.

6. A method of treating symptoms of aging frailty in a human subject, wherein the subject exhibits inflammaging; the method comprising:

(a) administering a therapeutically effective amount of a population of isolated allogeneic human mesenchymal stem cells to a subject in need thereof; and (b) decreasing the number of Temra cells (CD45RA$^+$, CCR7$^-$) in a sample of the subject's serum by at least 20% as compared to the number of Temra cells in a sample of the subject's serum prior to administration of said population of isolated allogeneic human mesenchymal stem cells, thereby treating said symptoms of aging frailty.

7. A method of treating symptoms of aging frailty in a human subject, wherein the subject exhibits inflammaging; the method comprising:

(a) administering a therapeutically effective amount of a population of isolated allogeneic human mesenchymal stem cells to a subject in need thereof; and (b) decreasing the TNF-α concentration in a sample of the subject's serum by at least 50% as compared to the TNF-α concentration in a sample of the subject's serum prior to administration of said population of isolated allogeneic human mesenchymal stem cells, thereby treating said symptoms of aging frailty.

8. A method of treating symptoms of aging frailty in a human subject, wherein the subject exhibits inflammaging; the method comprising:

(a) administering a therapeutically effective amount of a population of isolated allogeneic human mesenchymal stem cells to a subject in need thereof; and (b) increasing the CD4$^+$:CD8$^+$ T cell ratio in a sample of the subject's serum by at least 100% as compared to the CD4$^+$:CD8$^+$ T cell ratio in a sample of the subject's serum prior to administration of said population of isolated allogeneic human mesenchymal stem cells, thereby treating said symptoms of aging frailty.

* * * * *